United States Patent

Kurihara et al.

[11] Patent Number: 5,754,243
[45] Date of Patent: May 19, 1998

[54] LETTER-BOX TRANSFORMATION DEVICE

[75] Inventors: Kouichi Kurihara; Shuji Abe; Takeshi Inagaki; Shinji Yoda, all of Kanagawa-ken, Japan

[73] Assignee: Kabushiki Kaisha Toshiba, Kawasaki, Japan

[21] Appl. No.: 805,721

[22] Filed: Feb. 25, 1997

Related U.S. Application Data

[63] Continuation of PCT/JP96/02003 Jul. 18, 1996.

[30] Foreign Application Priority Data

Jul. 19, 1995 [JP] Japan .................. 7-183047
Oct. 26, 1995 [JP] Japan .................. 7-279370

[51] Int. Cl.$^6$ .................................................. H04N 1/01
[52] U.S. Cl. ........................................ 348/445; 348/913
[58] Field of Search ................................ 348/409, 445, 348/913; H04N 7/01

[56] References Cited

U.S. PATENT DOCUMENTS 5,642,169  6/1997  Yamamoto ................ 348/445
5,688,820  11/1997 Naka ....................... 348/445

FOREIGN PATENT DOCUMENTS 2-262792  10/1990  Japan .
5-207519  8/1993  Japan .

*Primary Examiner*—Howard W. Britton
*Attorney, Agent, or Firm*—Cushman Darby & Cushman IP Group of Pillsbury Madison & Sutro LLP

[57] ABSTRACT

A read control circuit reads image data, which are stored in a decoding image memory, at a read speed m/n times a display speed. These image data are written to line memories by a write control circuit. A read-address control circuit reads the image data from the line memories at a display speed, and line data for a letter-box image are generated by multipliers and an adder. Specifically, the line data of m lines which are read from the decoding image memory are transformed to n lines so that a letter-box display is made possible. Thus, letter-box transformation processing is performed with less memory capacity without the use of a field memory.

13 Claims, 19 Drawing Sheets

| OUTPUT TO LINE MEMORY 14 | OUTPUT TO LINE MEMORY 15 | OPERATION RESULTS | LETTER-BOX OUTPUT |
|---|---|---|---|
| LINE 0 | LINE 1 | → y0 → | y0 |
| LINE 2 | LINE 1 | → y1 → | y1 |
| LINE 2 | LINE 3 | → y2 → | y2 |
| LINE 4 | LINE 5 | → y3 → | y3 |
| LINE 6 | LINE 5 | → y4 → | y4 |
| LINE 6 | LINE 7 | → y5 → | y5 |
| LINE 8 | LINE 9 | → y6 → | y6 |
| LINE 10 | LINE 9 | → y7 → | y7 |
| LINE 10 | LINE 11 | → y8 → | y8 |

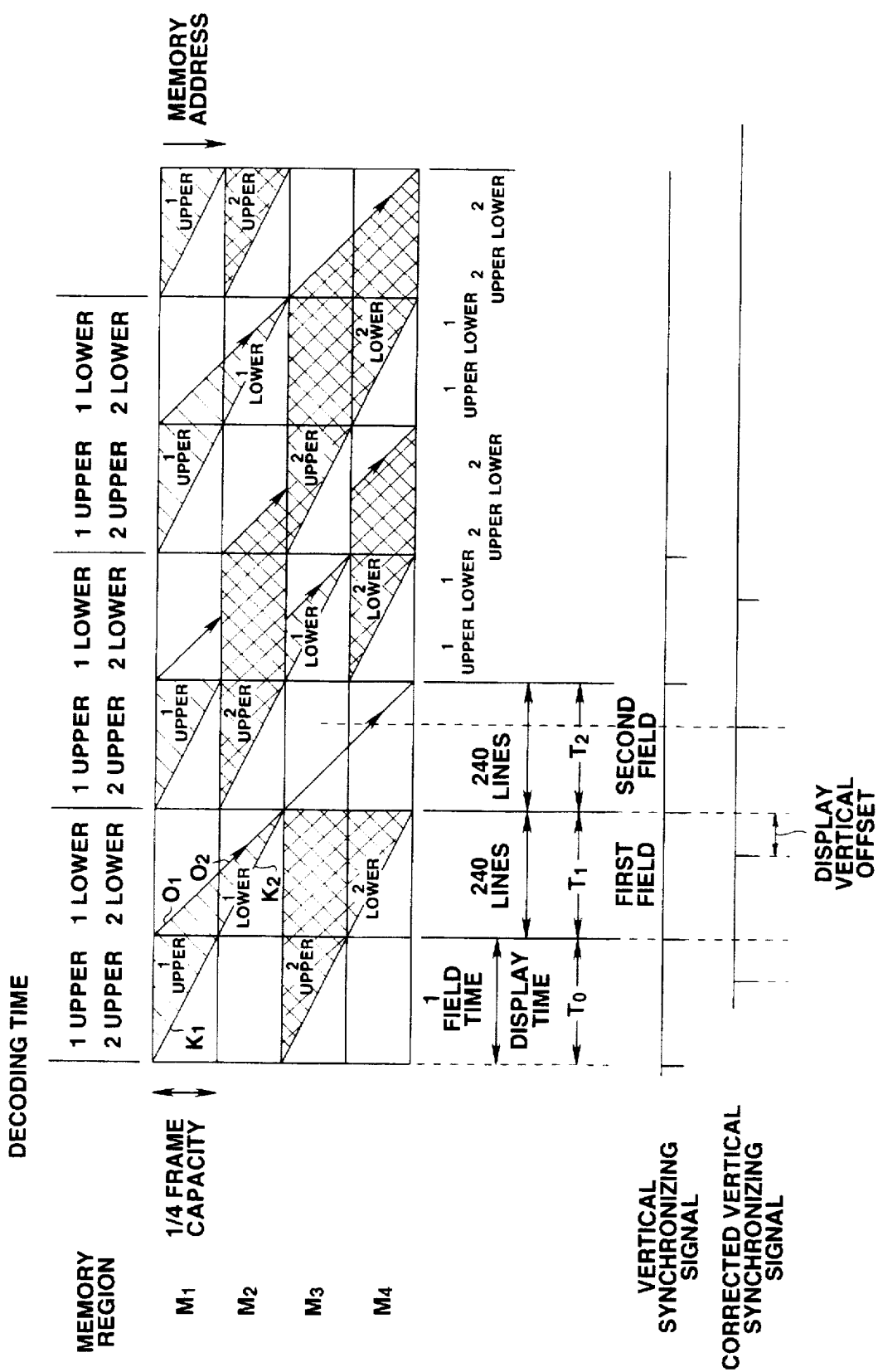

WHEN DISPLAYED ON
WIDE IMAGE PLANE

WHEN DISPLAYED ON
IMAGE PLANE HAVING 4:3

FIG.28

| INPUT | LINE MEMORY OUTPUT | OPERATION RESULTS | WRITE TO FIELD MEMORY | READ FROM FIELD MEMORY |
|---|---|---|---|---|
| LINE 0 | | | | |
| LINE 1 | LINE 0 | → y0 → | WRITE | |
| LINE 2 | LINE 1 | → y1 → | WRITE | |
| LINE 3 | LINE 2 | → y2 → | WRITE | y0 |
| LINE 4 | LINE 3 | --- → | NO WRITE | y1 |
| LINE 5 | LINE 4 | → y3 → | WRITE | y2 |
| LINE 6 | LINE 5 | → y4 → | WRITE | y3 |
| LINE 7 | LINE 6 | → y5 → | WRITE | y4 |
| LINE 8 | LINE 7 | --- → | NOT WRITE | y5 |
| LINE 9 | LINE 8 | → y6 → | WRITE | y6 |
| LINE 10 | LINE 9 | → y7 → | WRITE | y7 |
| LINE 11 | LINE 10 | → y8 → | WRITE | y8 |

# LETTER-BOX TRANSFORMATION DEVICE

This is a continuation of International Appln No. PCT/JP96/02003 filed Jul. 18, 1996.

BACKGROUND OF THE INVENTION

1. Field of the Invention

The invention relates to a transformation or conversion device for performing line-number transformation of decoding image data from an image memory which stores data coded by a compression system such as MPEG (moving Pictures Experts Group).

2. Description of the Related Art

The digitization of a video signal generally results in a substantial volume of information, which affects transmission speed or a signaling speed and the cost to perform transmission, recording or the like especially if that information is not compressed. For this reason, in transmission or recording of a digital video signal, an image compression technique is essential. In recent years, various standardization proposals have been considered such as MPEG (Moving Picture Experts Group). In the MPEG, DCT (Discrete Cosine Transformation) transformation, inter-frame predictive coding, run-length coding and entropy coding are used compositely to perform coding of the video signal. Specifically, in the MPEG system, not only compression due to the DCT (intra-frame compression) is performed within 1 frame, but also inter-frame compression in which correlation of the inter-frame is utilized to curtail or reduce redundancy in a direction of a time axis is employed. The inter-frame compression recognizes that properties of a frame resemble properties in before and after frames and utilizes a difference between the before and after frames, to produce a difference value for coding, thereby further reduce a bit rate. Particularly, motion compensation inter-frame predictive coding is effective in which motion of the image is predicted to find out a difference between the frames, to thereby reduce the predictive error.

A signal using a high efficiency compression coding system, such as the above-described MPEG, may be broadcast. In such broadcasting form, generally, the compression coding broadcast signal must be decoded on the receiving side to display an image. Specifically, the decoding processing returns the broadcasting signal to the original signal (image data) before coding and processing to display it on an image plane.

The above-described broadcasting signal includes, image data for an image plane having an aspect ratio of 16:9 (wide image plane), and image data for an image plane having an aspect ratio of 4:3 16:12 (current NTSC system). When an image which is based on these image data is displayed on an image plane which is different in aspect ratio from the above, may be distorted such that the image a display is not necessarily 1 in roundness or circularity. Further, if the image is magnified in an attempt to bring the roundness to 1, the left and right portions of the display images may be last.

For example, when, as shown in FIG. 22, the image data for the wide image plane are displayed on an image plane having the identical aspect ratio of 16:9, it is possible to display a normal image in which the roundness becomes 1. As shown in FIG. 23, however, when the image data for the wide image plane are displayed on an image plane having the aspect ratio of 4:3, such an image is displayed that it is crushed from the side so that the roundness is not 1.

In order to display the wide image data on the image plane which has the aspect ratio of 4:3 with the roundness of 1, it is necessary to perform pixel-number transformation in a horizontal direction or to perform line-number transformation in a vertical direction, to make a longitudinal ratio and a lateral ratio of the image on the image plane coincident with each other.

A horizontal pixel-number transformation of an image onto an image plane which has the aspect ratio of 4:3, is shown in FIG. 24. Vertical line-number transformation (letter-box transformation) processing of an image onto the image plane having an aspect ratio of 4:3, is shown in FIG. 25. In this connection, a case will be described in which the number of pixels of the wide image data is 720 pixels, and the number of lines is 480 lines.

As shown in FIG. 24, 540 pixels of a horizontal specific position, for example, of the wide image data which have 720 pixels in the horizontal direction are made 4/3 times as large in the horizontal direction so as to be transformed in number of pixels to 720 pixels and are displayed on all the area of the image plane which has the aspect ratio of 4:3. Specifically, a portion having 4:3 of the horizontal specific position of the wide image is used for display whereby, as a result, it is possible to display the image in which the roundness becomes 1, on the image plane having the aspect ratio of 4:3. In this case, the number of vertical lines is displayed by 480 lines.

As shown in FIG. 25, 480 lines for the wide image plane are transformed in line number to 360 lines which are 3/4 times as large in the vertical direction and are displayed as an image of the letter-box system (hereinafter referred to as "letter-box image"). In this system, a main image is displayed on a display region of 360 lines at the center in the vertical direction, and each of upper and lower 60 lines of the image display region becomes a no-definition part on which no image is displayed. Thus, it is possible to obtain a display image which uses the letter-box system in which the roundness becomes 1.

FIG. 26 shows an example of a processing method of an input image processed in letter-box transformation. In this connection, in the present example, an arrangement will be described in which two lines of the input image are used to perform filter processing (interpolation), to create an output line.

As described above, in the letter-box transformation, the number of scanning lines is transformed in scanning-line-number from 480 to 360. As shown in FIG. 26, in order that the number of lines of the input image is transformed to 3/4 to obtain the letter-box image. The transformation of image data of 4 lines to 3 lines of the input image are obtained by predetermined operation.

Specifically, as shown in FIG. 26, assuming that a start effective line of the input image is Y0, y0 line data are operated and are created from 2 lines including Y0 and Y1. Similarly, a y1 line is created from Y1 and Y2, a y2 line is created from Y2 and Y3 lines, and a y3 line is created from Y4 and Y5 lines. In this manner, the arrangement is such that data of 3 lines in the output image (letter-box image) are created from data of 4 lines in the input image.

In the line-number transformation processing, a line of the aforesaid four lines is thinned out by the operation processing which performs multiplication and addition processing by the use of a predetermined coefficient. Thus, it is possible that the line-number transformation processing in which 4 lines are made to 3 lines is successively performed to obtain effective scanning lines of the letter-box image which is made 3/4 times as large. In this manner, the letter-box display is made possible in which the number of lines of the input image in the vertical direction is made 3/4 times as large so that an image portion having the aspect ratio of 16:9 is displayed on the center of the image plane at the roundness of 1.

Related art of the letter-box transformation device which performs such letter-box transformation processing, is shown in to Japanese Patent Unexamined Publication No. HEI 5-207519 (207519/1993). In this publication, a 1 line memory for the vertical filter processing and a 1 filed memory for absorbing a display time difference which occurs due to the line-number transformation are used to perform the letter-box processing, to thereby obtain the letter-box image.

FIG. 27 is a block diagram for describing this related art. Further, FIG. 28 describes the operation of a device in FIG. 27. In this connection, only image data (video data) will be described for simplification of the description.

In FIG. 27, wide image data (squeeze image data) are inputted to an input terminal 1, which are obtained by decoding compression coding image data. Moreover, image data are outputted from an output terminal 9 after processing in letter-box transformation. In this case, a data rate of the image data which are input to terminal 1 is the same as an output data rate from the output terminal 9.

The inputted image data are given to a line memory 2 and a multiplier 5. The line memory 2 writes the inputted image data successively one line by one line. Furthermore, at the time of reading, the image data are delayed in a 1 line successively by read control due to a control circuit 3 and are outputted. An output signal of the line memory 2 is input to a multiplier 4. The multipliers 4 and 5 perform multiplication between the respectively inputted signals and predetermined coefficients K and (1–K), and each of the multiplication results is given to an adder 7. Specifically, two signals on the basis of the image data before and after a line are inputted to the adder 7. In this connection, the coefficients K and (1–K), of the multipliers 4 and 5 respectively are generated by a coefficient generation circuit 6, and become values necessary for making the number of effective scanning lines of the usual or ordinary image signal, for example, 3/4 times as large.

The adder 7 performs addition of the inputted data, and gives the added data to a field memory 8. The field memory 8 writes the inputted addition signal and stores the same by the write control due to the control circuit 3. At this time, the control circuit 3 controls write with respect to the field memory 8 such that 3 lines are written, and a 1 line is not written, successively, with respect to the inputted addition data of the line. Specifically, by this write control, thinning is performed so that the number of lines becomes 3/4 times the original number of lines. Read of the addition signal by the field memory 8, is performed by the read control due to the control circuit 3. In this case, the control circuit 3 performs control such that they are read successively under the intact or untouched stored state (intact or untouched sequence). Thus, the addition data which are read from the field memory 8 become data in which the number of lines is 3/4 times the number of lines of the input image data, transferring the image data on the basis of the letter-box image. These image data are outputted to a processing circuit for displaying the same on the image plane having the aspect ratio of 4:3, for example, through the output terminal 9.

Operation of the device shown in FIG. 27 is depicted in FIG. 28. For the wide image data input to the input terminal 1, it is assumed that, of the effective scanning lines (also referred to as "effective lines") for forming the image of a 1 field or a 1 frame in the input image data, the start line is a line 0, and the subsequent lines are line 1, a line 2, etc., and the output data of the line memory 2 is delayed one line, as shown in FIG. 28. Specifically, to one multiplier 4, data are provided which are delayed one line from the input image signal at the input terminal 1. Further, to the other multiplier 5, the image data are not delayed. Then, the coefficients K and (1–K) for performing the letter-box transformation processing are generated by the coefficient generation circuit 6. These coefficients K and (1–K) are provided to the respective multipliers 4 and 5. Then, the multiplier 5 performs multiplication between the signal of the same line at the time of input and the coefficient (1–K), and the multiplication results are input to the adder 7. The multiplier 4 performs multiplication between the data which are delayed and the coefficient K, and the multiplication results are input to the adder 7.

The adder 7 adds the output data of the respective multipliers 4 and 5 to each other. Specifically, as the operation results, as shown in FIG. 28, it is possible to obtain only the image data which are used in output. The image data which are these operation results are given to the field memory 8. At this time, by the write control due to the control circuit 3, the addition data (operation results) from the adder 7 are written successively to the field memory 8 such that 3 lines are written, and one line is not written, as shown in FIG. 28. Then, at the time of read, by the read control due to the control circuit 3, the data are read under the intact state (intact recording sequence).

Specifically, the data which pass through the line memory 2 and the data which does not pass through the line memory 2 are used to perform interpolation in the vertical direction, to create the line of the letter-box image, to write 3 lines which are necessary for the arrangement of the letter-box image. A control in which an unnecessary line is not written is repeated, whereby a line within 4 lines is thinned. Thus, the output data of the field memory 8 is such that the number of effective scanning lines is made to 3/4 times the input image, and the letter-box image having the aspect ratio of 16:9 can be obtained.

In order to display the letter-box image, the line which is outputted through the output terminal 9 must be continuous. Specifically, in order to perform thinning processing of the number of input lines in the letter-box image processing, it is necessary to adjust or regulate a time difference between time of the operation processing results and time of display. In order to adjust this time difference, the 1 field memory 8 becomes an essential element. However the 1 field memory 8 becomes expensive because a high capacity is required to form the letter-box transformation device, in decoding the data such as an MPEG, so that if this letter-box transformation device is used, the cost of the whole device become expensive.

In view of the above, it is an object of the present invention to provide a letter-box transformation device which can perform letter-box transformation processing without the use of an expensive 1 field memory, and can reduce the cost of the whole device.

Furthermore, it is an object of the present invention to provide a letter-box transformation device in which a decoding memory which is used in a decoding device of coding data is utilized whereby letter-box transformation processing is enabled by a plurality of line memories which are relatively low in capacity so that the device scale can be reduced.

Further, it is an object of the present invention to provide a letter-box transformation device in which letter-box transformation processing is enabled by a plurality of line memories which are relatively low in capacity without the fact that capacity of a decoding memory which is used in a decoding device of coding data increases, whereby the device scale can be reduced.

SUMMARY OF THE INVENTION

A letter-box transformation device of the present invention comprise memory means for storing image data from decoding means which performs decoding processing with respect to coding data, output means for reading the image data which are stored in the memory means and for creating output image data for a letter-box image, on the basis of the read image data to output the same in predetermined image display time, and read control means for performing read of the image data from the memory means at a rate higher than a write rate to the memory means.

In the present invention, the image data which are stored in the memory means are read at the rate higher than the write rate, by the read control means. The image data which are read from the memory means are given to the output means so that the output image data for the letter-box image are created.

Further, a letter-box transformation device of the present invention may comprise an image memory which stores image data obtained by decoding processing with respect to coding data, first read control means for reading data for m lines from the image memory within image display time of n (n<m) lines to output the same, at least two line memories for storing the image data which are read from the image memory by the first read control means, operation processing means for applying predetermined scanning-line-number transformation operation processing to the image data which are read from said at least two line memories, to perform scanning-line-number transformation from the m line to the n line, coefficient generation means for outputting an operation coefficient which is used in said operation processing, write control means for writing the image data which are read by the first read control means to at least two line memories, respectively, every line used in the scanning-line-number transformation operation processing, and second read control means for reading the image data of the line which is used in the scanning-line-number transformation operation processing, from at least two line memories, by the image display time of the 1 line, to output the same to said operation processing means.

The image memory stores the decoded image data. The first read control means reads data for m lines from the image memory within the image display time of n (n<m) lines to output the same. The write control means writes the image data which are read by the first read control means, respectively, to at least two line memories which are used in scanning-line-number transformation operation processing from an m line to an n line. The second read control means reads the image data of the line which is used in the scanning-line-number transformation operation processing, from the line memories, at the image display time of the 1 line, to output the same. The operation processing means applies the scanning-line-number transformation operation processing to the read image data to perform line-number transformation. Thus, the number of lines is transformed from m to n lines.

Likewise, a letter-box transformation device of the present invention may comprise an image memory for storing image data which are obtained by decoding processing with respect to coding data, first read control means for dividing the image data for the number of lines n times the number of lines which is required for scanning-line-number transformation operation processing from an m line to an n line, into a predetermined amount of image data units which is less than an amount of image data for the 1 line, within image display time of the n line, and for reading the same from the image memory to output the same, at least two memories with capacity to store a predetermined amount of image data which is read from image memory by the first read control means, operation processing means for applying the predetermined scanning-line-number transformation operation processing to the predetermined amount of image data which is read from the memories to perform scanning-line-number transformation from the m line to the n line, coefficient generation means for outputting an operation coefficient which is used in said operation processing, write control means for writing the predetermined amount of image data which is read by said first read control means, respectively to said at least two memories every lines which are used in said scanning-line-number transformation operation processing, and second read control means for reading said predetermined amount of image data of the line which is used in said scanning-line-number transformation operation processing, from said at least two memories, at the image display time of said predetermined amount of image data, to output the same to said operation processing means.

As before, the image memory stores the decoded image data. The first read control means reads the data for the m line from the image memory within the image display time of the n (n<m) line and outputs the same. The write control means respectively writes the image data which are read by the first read control means to at least two memories by units of the predetermined amount of image data every lines which are used in the scanning-line-number transformation operation processing from the m line to the n line. The second read control means reads the predetermined amount of image data of the lines which are used in the scanning-line-number transformation operation processing, from the at least two memories, at the image display time of predetermined image data to output the same. The operation processing means applies the scanning-line-number transformation operation processing to the read image data to perform line-number transformation. Thus, the number of lines is transformed from the m line to the n line.

A letter-box transformation device of the present invention may also comprise first read procedure for reading image data for an m line which are stored in an image memory, within image display time of an n (n<m) line to output the same, first write procedure for storing the image data which are read from the image memory to a plurality of memories every lines which are used in scanning-line-number transformation operation processing, at a predetermined data unit, second read procedure for reading the image data which are used in the scanning-line-number transformation operation processing, from the plurality of memories at a speed corresponding to image display time, and operation procedure for applying predetermined operation processing to the image data which are read from the plurality of memories, to obtain output image data of a letter-box image.

In this configuration by the first read procedure, the image data of the m line are read by the display time of the n line, and are written to the plurality of memories in the predetermined data unit every lines by the first write procedure. By the second read procedure, the image data which are used in the scanning-line-number transformation operation processing are read at the speed corresponding to the image display time, and are processed in scanning-line-number transformation operation by the operation procedure. The read speed of the first read procedure is faster than the display speed, whereby the scanning-line-number transformation operation processing is enabled which uses the memory having relatively the small capacity, which stores the image data which are used in the scanning-line-number transformation operation processing.

A letter-box transformation method of the present invention may comprise write procedure for writing image data which are obtained by decoding of coding data, to memory means at predetermined synchronizing timing, and read procedure for reading the image data which are stored in said memory means, at a read rate higher than a write rate in the write procedure, at synchronizing timing which is different from said predetermined synchronizing timing.

In this method, by the read procedure, the image data which are stored in the memory means are read at the read rate higher than the write rate of the write procedure. Thus, scanning-line-number transformation operation processing which is necessary for letter-box transformation is enabled.

Another letter-box transformation method of the present invention may comprise decoding means into which coding data including bidirectional predictive coding data which use forward and rearward reference images are inputted, for performing in decoding the inputted coding data by a predetermined block unit, to output decoding data, memory means for storing decoding data of a frame arrangement which are outputted from said decoding means, by decoding processing with respect to said bidirectional predictive coding data to output the same in interlace order, to thereby obtain a video signal having the interlace arrangement, synchronizing-signal generation means for generating a synchronizing signal which is synchronized with the video signal and for advancing, in phase, or for delaying, in phase, the synchronizing signal by a predetermined phase to generate a corrected synchronizing signal which is used for display, and write and read control means for performing write with respect to the memory means with the synchronizing signal serving as a time reference and for performing read with respect to the memory means with said corrected synchronizing signal serving as the time reference, to obtain the video signal having the interlace arrangement.

The decoding data from the decoding means are given to the memory means, and are written by the write and read control means with the synchronizing signal serving as the time reference. The synchronizing-signal generation means generates the corrected synchronizing signal which is advanced in phase or which is delayed in phase by the predetermined phase from the synchronizing signal. The write and read control means reads the decoding data of the memory means in the interlace order with the corrected synchronizing signal serving as the time reference. An amount of advancement in phase or an amount of delay in phase of the corrected synchronizing signal is suitably set, whereby, also when the read rate is higher than the write rate, the read is prevented from being preceded to the write. Thus, the video signal of the interlace arrangement which has predetermined display offset is obtained.

Finally a letter-box transformation device of the present invention may comprise decoding means into which coding data including bidirectional predictive coding data which use forward and rearward reference images are inputted, for performing in decoding the inputted coding data by a predetermined block unit, to output decoding data, memory means for storing decoding data of a frame arrangement which are outputted from said decoding means, by decoding processing with respect to said bidirectional predictive coding data to output the same in interlace order, to thereby obtain a video signal having the interlace arrangement, synchronizing-signal generation means for generating a corrected synchronizing signal which is synchronized with the video signal and in which the synchronizing signal which is used for display is advanced, in phase, or is delayed, in phase, by a predetermined phase, decoding control means for controlling decoding of the decoding means with the corrected synchronizing signal serving as a time reference, and write and read control means for performing write with respect to the memory means with said corrected synchronizing signal serving as the time reference, and for performing read with respect to the memory means with the synchronizing signal serving as the time reference, to obtain the video signal having the interlace arrangement.

The synchronizing-signal generation means generates the corrected synchronizing signal which is advanced, in phase, or which is delayed, in phase, by the predetermined phase more than the synchronizing signal. The decoding means performs decoding with the corrected synchronizing signal serving as the time reference. The decoding data from the decoding means are given to the memory means. The memory means outputs the stored data in interlace order. The corrected synchronizing signal is advanced in phase or is delayed in phase by the predetermined phase more than the synchronizing signal as the time reference of decoding. Also, when the read rate in the memory means is higher than the write rate, the read does not precede the write. Thus, the video signal of the interlace arrangement is obtained which has the predetermined display offset, from the output of the memory means.

BRIEF DESCRIPTION OF THE DRAWINGS

FIG. 16 to FIG. 21 are explanatory views for describing operation of the sixth embodiment;

FIG. 28 is an explanatory view for describing operation of the letter-box transformation device in FIG. 27.

DESCRIPTION OF THE PREFERRED EMBODIMENTS

Description of the various embodiments of the invention will be described in detail with reference to the drawings.

Figure 1:
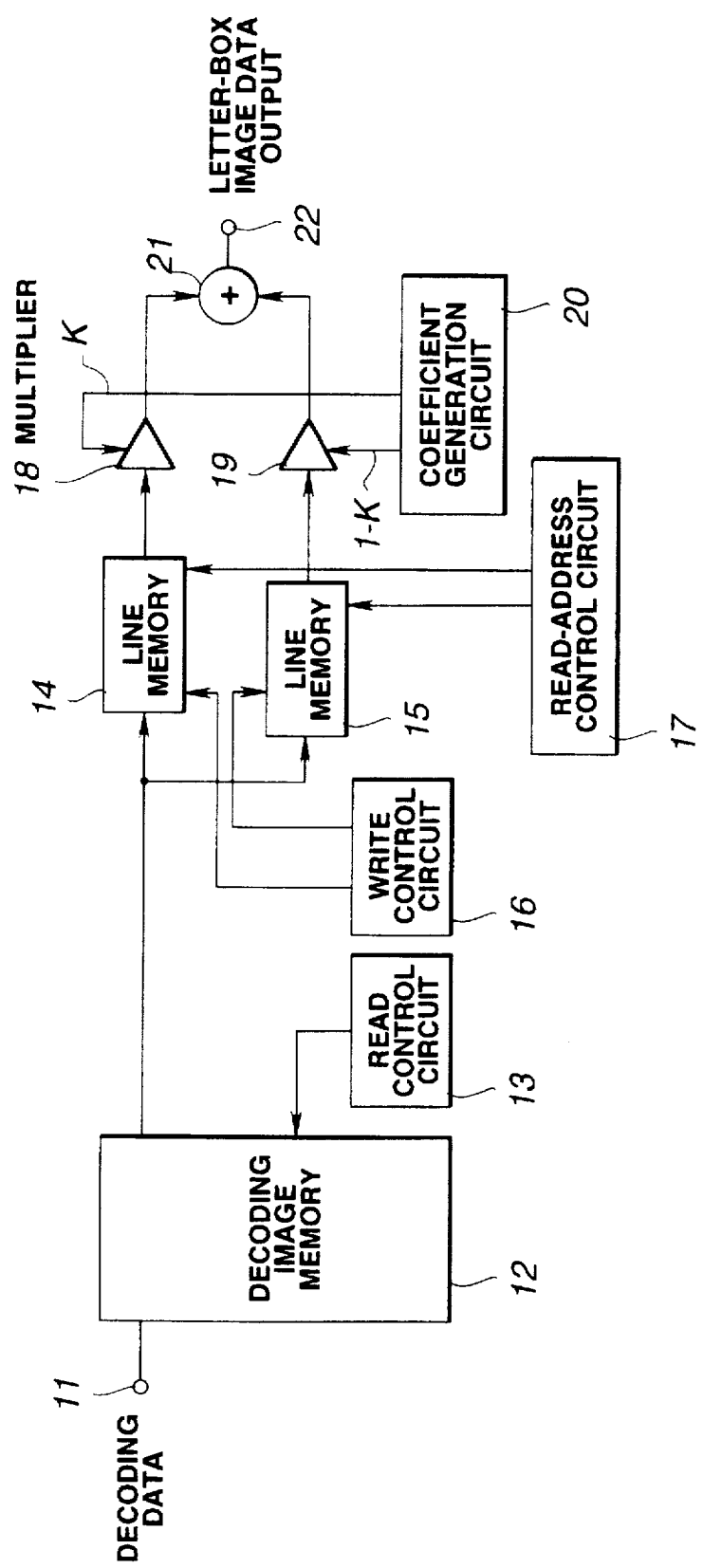
FIG. 1 is a block diagram showing a first embodiment of a letter-box transformation device relating to the present invention.
Figure 2:
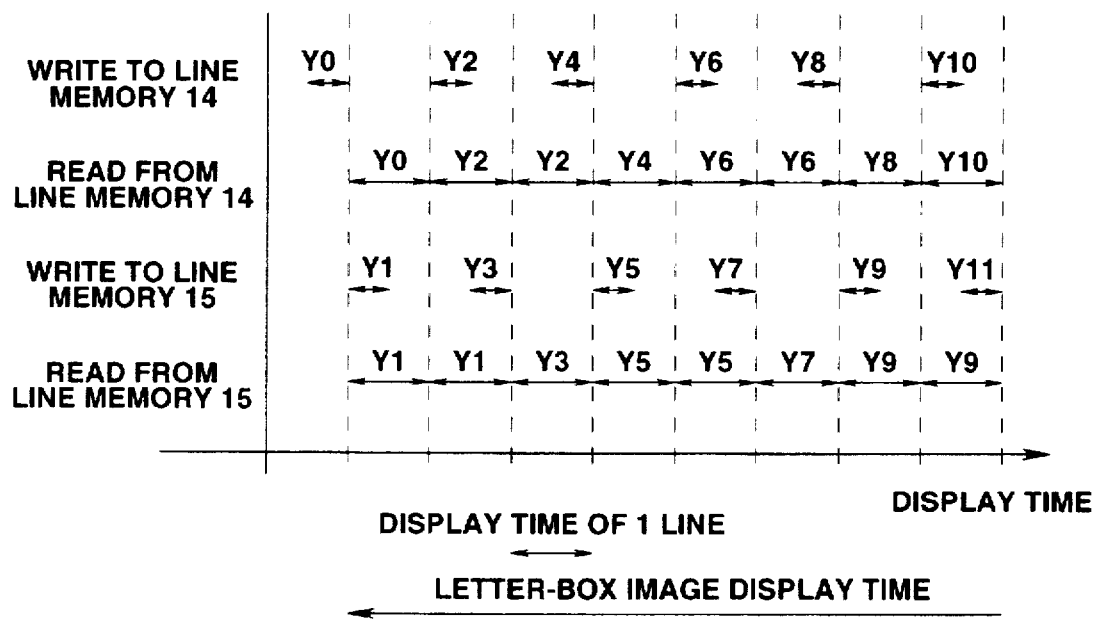
FIG. 2 is an explanatory view for describing write control operation.
Figures 3, 4:
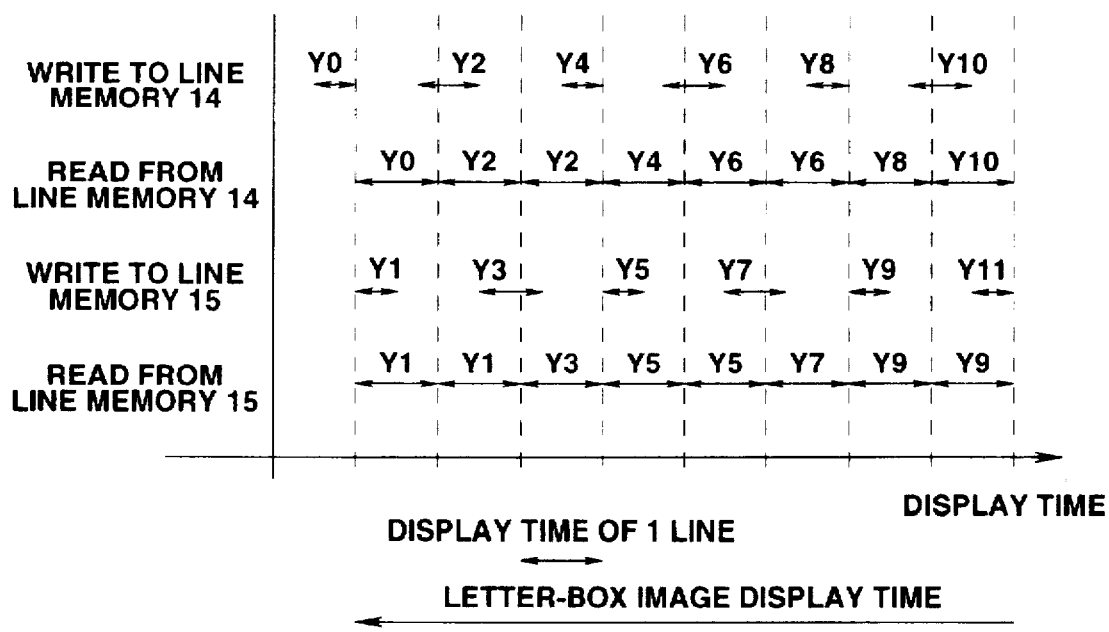
FIG. 3 is an explanatory view for describing operation of the device shown in FIG. 1.
FIG. 4 is an explanatory view of a second embodiment of the letter-box transformation device relating to the present invention.

FIG. 1 to FIG. 3 show an embodiment of a letter-box transformation device relating to the present invention. FIG. 1 is a block diagram of the device. FIG. 2 is an explanatory view for describing write control of a line memory, and FIG. 3 is an explanatory view for describing operation illustrated in FIG. 1. In this connection, the number of line memories is p. In the present embodiment, the number of line memories is provided as p=2 to perform letter-box transformation processing.

As shown in FIG. 1, decoding data of compression coding performed by a compression system such as an MPEG, are inputted to an input terminal 11 of the letter-box transformation device. The inputted decoding data are given to a decoding image memory 12.

The decoding image memory 12 stores the decoding data (image data). Read of the image data which are stored in the decoding image memory 12 is controlled by a read control circuit 13. For example, the read control circuit 13 reads the image data of a line unit (hereinafter, referred also to as "line data") from the decoding image memory 12 at a speed higher than a display speed, to output the same. Specifically, the read control circuit 13 reads, at a high speed, the line data for an m (m is an integer equal to or greater than 1) line from the decoding image memory 12 within data output time (display time) of an n (n<m) line, to give the same to two line memories 14 and 15, respectively.

The two line memories 14 and 15 write line data which are inputted respectively by write control due to a write control circuit 16. At this time, the write control circuit 16 performs control such that, only when the line data which are inputted to each of the line memories 14 and 15 are necessary, write is performed with respect to either one of the line memories. The predetermined line data having 2 lines which are read from the decoding image memory 12 are written to the line memories 14 and 15 by line units. For example, the line data of the adjacent lines are written respectively to the line memories 14 and 15.

The line memories 14 and 15 update the data of the line memory, on the basis of a control signal from the write control circuit 16. Specifically, the line memories 14 and 15 successively write the image data for the line. When the image data are read, the image data are read by control of a read-address control circuit 17.

The read-address control circuit 17 performs read control for reading the image data from the line memories 14 and 15 at the read rate which corresponds to the outputted display speed. Thus, the line data for the n line are outputted from the line memories 14 and 15 at the display time of the n line. The line data for display are so arranged as to be created by operation of both line data of two lines which are read from the line memories 14 and 15. Specifically, the line data for the m lines which are written to the line memories 14 and 15 are transformed in line number to the line data for the n lines.

For this line-number transformation operation, the output image data of the line memories 14 and 15 are given respectively to multipliers 18 and 19. The multipliers 18 and 19 perform multiplications, respectively, by the inputted image data and predetermined coefficients K and (1–K), and each of the multiplication results is given to an adder 21. Specifically, each of the image data which are given to the adder 21 becomes one in which operation due to the multipliers 18 and 19 is applied to the line data of the adjacent two lines. for example. In this connection, the coefficients K and (1–K) which are given to each of the multipliers 18 and 19 are generated by a coefficient generation circuit 20. The arrangement is such that the coefficient generation circuit 20 generates the coefficients K and (1–K) which are necessary for increasing the number of effective scanning lines of the ordinary or usual image signal by n/m times, to give the same to the multipliers 18 and 19, respectively.

Figure 26:
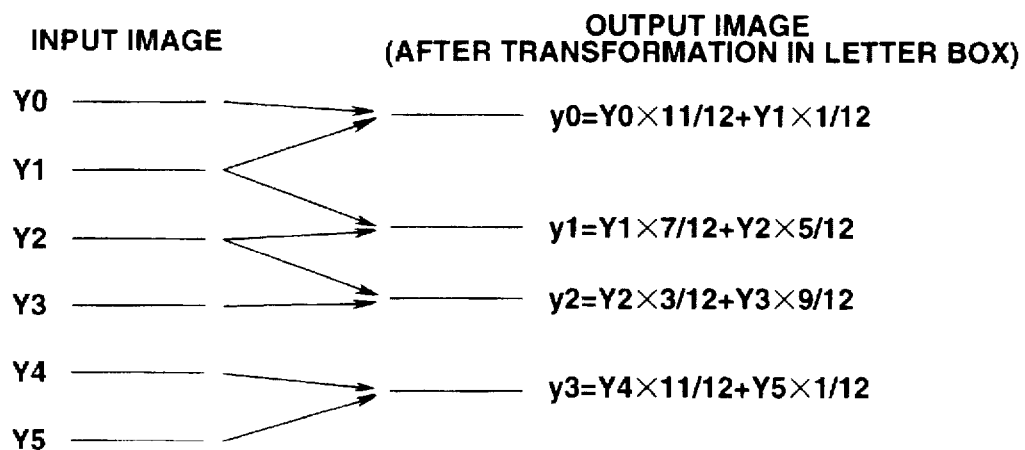
FIG. 26 is an explanatory view of letter-box transformation processing.

In connection with the above, the decoding data which are inputted to the decoding image memory 12 are a squeeze image of the wide video signal. When this squeeze image is displayed in letter-box on the display having the aspect ratio of 4:3, n=3, and m=4. The coefficient generation circuit 20 generates a coefficient which is necessary for increasing the number effective scanning lines by 3/4 times. The coefficient K in this case is a value x/12 as shown in FIG. 26, for example.

The adder 21 performs addition of the inputted data. The addition results of the adder 21 become the image data in which the number of lines is increased by n/m times as compared with the number of lines of the inputted image data. Thus, it is also possible to transform the squeeze image to the number of lines on the basis of the letter-box image. The image data from the adder 21 are outputted to the processing circuit which performs processing for displaying the outputted image data on the image plane having the aspect ratio of 4:3, for example, through an output terminal 22.

Figure 16:
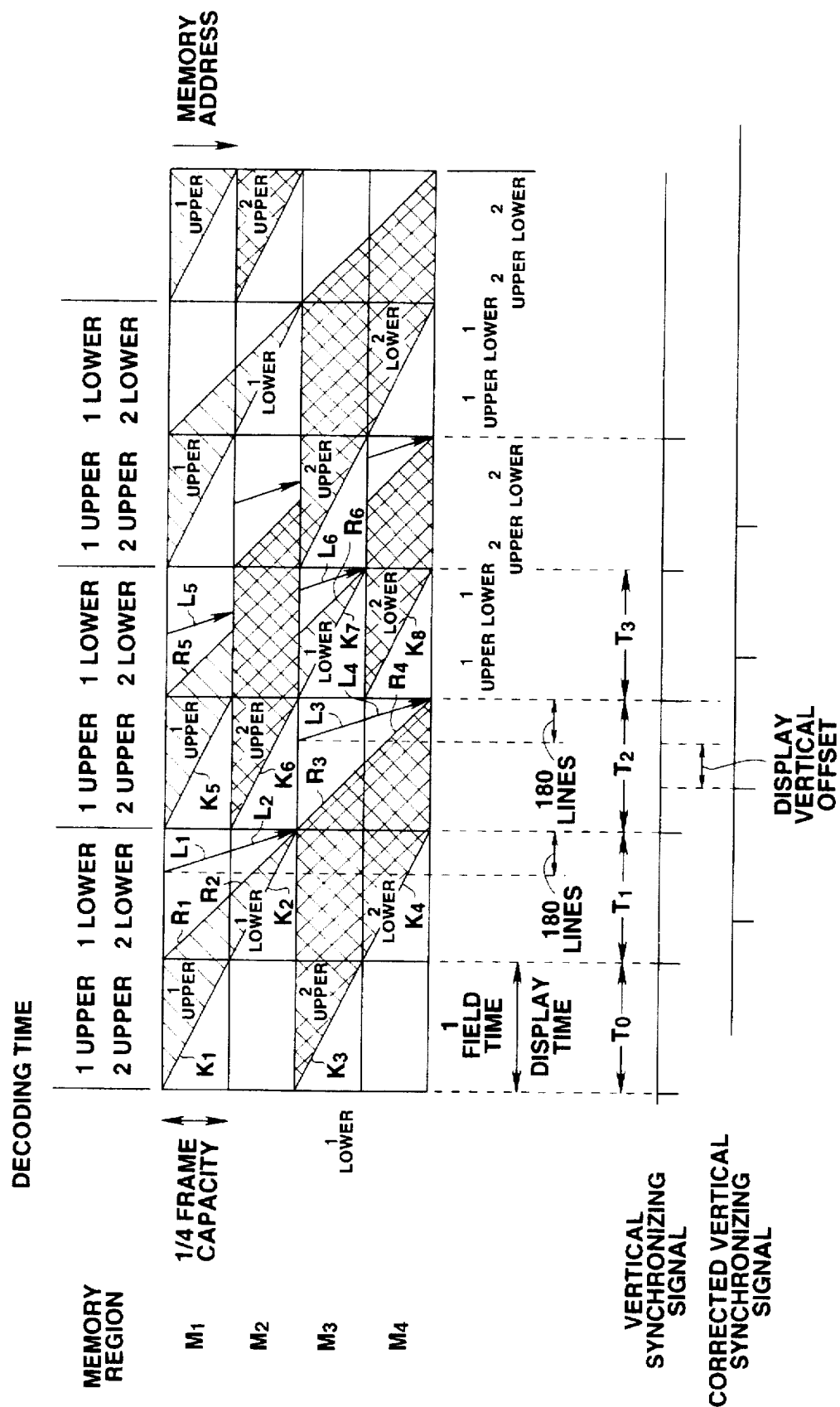
Figure 27:
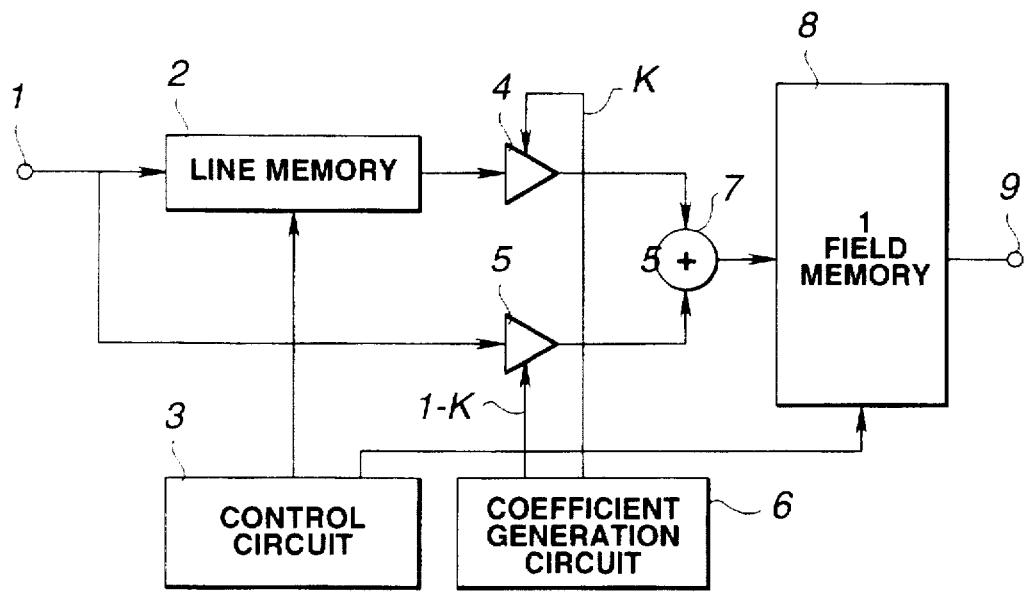
FIG. 27 is a block diagram showing a related art of a letter-box transformation device.

In this manner, the letter-box transformation device is formed without the use of a 1 field memory (refer to FIG. 16). Time adjustment for thinning is necessary for the letter-box transformation processing. In the related art shown in FIG. 27, the 1 field memory was necessary.

In the present embodiment, however, as a method of solving this time adjustment, a method is employed which controls the read of the line data from the decoding image memory 12 due to the read control circuit 13, write and read of the line data with respect to the line memories 14 and 15 due to the write control circuit 16, and read of the two line memories 14 and 15 due to the address control circuit 17, to solve the time adjustment, whereby it is enabled to perform the letter-box transformation processing without the fact that the 1 field memory is used.

Next, an example when the squeeze image which has the number of effective scanning lines of 480 lines is transformed to the letter-box image which has the number of effective scanning lines of 360 will be described with reference to FIG. 2 and FIG. 3. FIG. 2 shows write and read control of the two line memories. In this connection, FIG. 2 shows display time (letter-box image display time), and shows write and read operation states with respect to each of the line memories 14 and 15 in accordance with every display time of the line.

In the letter-box transformation shown in FIG. 2 and FIG. 3, n=3, and m=4. The decoding image memory 12 stores the decoding data which are inputted through the input terminal 11. The reading control circuit 13 reads, at a high speed, the line data for four lines from the decoding image memory 12 within data output time (display time) of the 3 lines (a read rate or a read speed from the line memory). The read speed from the decoding image memory 12 should be equal to or more than 4/3 times the display speed. FIG. 2 shows an example wherein the read speed is twice the display speed. The read line data are given respectively to the two line memories 14 and 15. The two line memories 14 and 15 store the line data which are respectively inputted by the write control due to the write control circuit 16.

Normally, the read speed from each of the line memories 14 and 15 is coincident with the data speed which is outputted through the output terminal 21. Further, the write speed to each of the line memories 14 and 15 is coincident with the read speed from the decoding image memory 12. However, in the present embodiment, the write speed to each of the line memories 14 and 15 is twice the read speed of each of the line memories 14 and 15.

As shown in FIG. 2, a write period to and a read period from the line memories 14 and 15 correspond to the length shown by arrows in the figure. Specifically, the arrowed periods which show the read period and the write period show a write period and a read period of the data for one line, of the respective line memories. In the present embodiment, as described above, setting is made such that the write period of the line data to each of the line memories 14 and 15 due to the write control circuit 16 becomes a period half the read period, that is, the write speed is twice the read speed. In this connection, Y0, Y1, Y2, Y3 and ... which are shown by the arrows of the read period and the write period are the number of lines of the read or written line data.

For example, the read control circuit 13 reads successively the line data of Y1, Y2, Y3 ... from the start line Y0 of the number of effective scanning lines, from the decoding image memory 12 at a speed twice the read speed of the line memory 14, to alternately give the same to the line memory 14 and the line memory 15. Simultaneously, the write control circuit 16 writes the line data which start from the read start line Y0, alternately to the line memory 14 and the line memory 15 at the speed the same as the read speed. For example, regarding the line memory 14, as shown in FIG. 2, the line data of each of the lines Y0, Y2, Y4, Y6 ... are written at an interval of the display time of 1 line.

When the write of the line memory 14 has been completed, line data of the next line are written to the line memory 15 by the write control circuit 16. Specifically, also regarding the line memory 15, the line data of the lines Y1, Y3, Y5, Y7, ... are written successively at the interval of the display time of the line, as shown in FIG. 2. That is, the line data of the adjacent two lines are stored in the line memories 14 and 15.

The read-address control circuit 17 outputs the line data of two lines which are stored in these two line memories 14 and 15 at the display time of the line. The read-address control circuit 17 does not read the line data of the identical line, preceding the write of the line data due to the write control circuit 16. Furthermore, the write control circuit 16 does not write the line data of the next line, preceding the read of the line data due to the read-address control circuit 17. Specifically, the write control circuit 16 and the read-address control circuit 17 suitably set the write address and the read address, respectively, whereby, for example, the read of the data of the line Y1 does not precede more than the data write of the line Y1 with respect to the line memory 15. Moreover, for example, the data write of the line Y3 does not precede more than the data read of the line Y1 with respect to the line memory 15.

Thus, in the line memory 14, since the line data which are read continuously after completion of read of the respective line data of the line Y2, the line Y6, the line Y10 ... are not written, read is controlled such that the line data of the identical line are repeatedly read. In this connection, the line data of the lines Y4, Y8, ... are outputted only once. Then, it is possible as shown in FIG. 2 to output the predetermined line data continuously to the multiplier 18. Regarding the line memory 15, because the line data which are read continuously after completion of read of the respective line data of the line Y1, the line Y5, the line Y9 ... are not written, read is controlled such that the line data of the identical line are repeatedly read. In this connection, the line data of the lines Y3, Y7, ... are outputted only once. Then, as shown in FIG. 2, it is possible to output the predetermined line data continuously to the multiplier 19.

In this manner, the read control due to the read-address control circuit 17 is performed whereby the output line data shown in FIG. 3 are outputted from the line memory 14 and the line memory 15. The output line data of each of the line memories 14 and 15 are given to the multipliers 18 and 19, and are multiplied to the coefficients K and (1−K) which are generated by the coefficient generation circuit 20. Outputs from the respective multipliers 18 and 19 are added to each other by adder 21 so that the operation processing results shown in FIG. 3 are obtained.

As shown in FIG. 3, operation results y0 are generated from the line data of the lines Y0 and Y1. Operation results y1 are generated from the line data of the lines Y2 and Y1. Operation results y3 are generated from the line data of the lines Y2 and Y3. As described previously, since the line data of the lines Y3, Y4, Y7, Y8, ... are outputted only one by one from the line memories 14 and 15, operation is not performed which uses the line data of the lines Y3 and Y4 and the line data of lines Y7 and Y8. Specifically, the operation results y4 are generated on the basis of the line data of the lines Y4 and Y5.

Thus, as shown in FIG. 3, it is possible to obtain the operation results y0, y1, ..... These operation results are outputted through the output terminal 22 as y0, y1, ... of the effective lines of the letter-box image. The number of effective lines of the inputted decoding data is 480, whereas the number of outputted effective lines is 360. These line data are outputted continuously within the letter-box image display time (refer to FIG. 2), whereby it is possible to form the effective lines on the basis of the letter-box image.

In connection with the above, since there is time when the write to the line memories 14 and 15 is not performed, the read speed of the line data from the decoding image memory 12 becomes, on average, 4/3 times the output data speed. Accordingly, the data of 480 lines are read by the control due to the aforesaid read control circuit 13 within the display time of 360 lines which are outputted through the output terminal 22.

In this manner, according to the present embodiment, the data for the m lines are read, at a high speed, from the decoding image memory 12 within the data display time of the n (n<m) lines, and are written to the line memory of p (p≧2), and write to these line memories is controlled, whereby such advantages are obtained that it is possible to perform the letter-box transformation processing by the memory capacity for the p lines without the fact that the 1 field memory is used. Thus, such advantages are also obtained that the cost of the whole letter-box transformation device can be reduced.

For the letter-box transformation device according to the present invention, it is possible to perform the letter-box transformation processing even when the read of the line data from the encoding image memory 12 and the write speed to each of the line memories 14 and 15, in the aforesaid embodiment, are set to 4/3 times the output data speed. Such embodiment is shown in FIG. 4.

FIG. 4 shows a second embodiment of a letter-box transformation device relating to the present invention, and is an explanatory view for describing write and read control operation. In this connection, the marks and signs shown in FIG. 4 are shown by a description or illustration method similar to that in FIG. 2.

The second embodiment is arranged by a circuit arrangement similar to that of the embodiment illustrated in FIG. 1. The present embodiment is different from the aforementioned embodiment in that the read speed of the line data due to the read control circuit 13 and the write speed to the line memories 14 and 15 due to the write control circuit 16 are operated at m/n times (4/3 times, for example) the output data speed, whereby the letter-box processing is performed.

As shown in FIG. 4, the read control circuit 13 performs control such that the data for the m line are read at a high speed from the decoding image memory 12 at the output time of the n (n<m) line data, to give the same to each of the line memories 14 and 15. Then, the write control circuit 16 controls write such that the write speed of each of the line memories 14 and 15, for example, increases m/n times (4/3 times, for example) the read speed of each of the line memories 14 and 15.

For example, the read control circuit 13 successively reads the line data of Y1, Y2, Y3 ... from the start line Y0 of the number of effective scanning lines from the decoding image memory 12 at a speed 4/3 times the read speed of the line memory 14, to alternately give the same to the line memory 14 and the line memory 15. Simultaneously, the write control circuit 16 alternately writes the line data starting from the read start line Y0 to the line memory 14 and the line memory 15, at a speed the same as the read speed. Then, regarding the line memory 14, as shown in FIG. 4, the line data in the start lines Y0, Y2, Y4, Y6 ... are written at the write period interval. With respect to the line memory 15, simultaneously with the fact that read of the aforesaid line memory 14 has been completed, the arrangement is such that the read line data are successively written by the read control circuit 13. Specifically, simultaneously with the fact that the write due to the line memory 14 has been completed, the line data in the lines Y1, Y3, Y5, Y7, ... are successively written at the write period interval as shown in FIG. 4.

Regarding the read of the line data from these two line memories 14 and 15, the written line data for the line are read simultaneously in the display time of the line by the read-address control circuit 17. In this manner, the read control due to the read-address control circuit 17 is performed, whereby the output line data of the line memory 14 and the line memory 15 can obtain the output line similar to that in the first embodiment. Thereafter, the output line data of each of the line memories 14 and 15 are given to the multipliers 18 and 19 similar to the first embodiment, and are multiplied by the coefficients K and (1−K) which are generated by the coefficient generation circuit 20. These multiplication results are added to each other by the adder 21, and there are obtained the operation processing results shown in FIG. 3.

Thus, the lines which are outputted through the output terminal 22 are outputted continuously within the letter-box image display time (refer to FIG. 2), whereby it is possible to obtain the letter-box image data which become the effective lines y0, y1, y2, y3 ... on the basis of the letter-box image similarly to the first embodiment.

In this manner, according to the present embodiment, even when operation is made such that the write speed of the line data of the line memories 14 and 15 is 4/3 times the read speed, it is possible to obtain advantages similar to those of the first embodiment.

Further, in the letter-box transformation device according to the present invention, even when the read speed of the line data from the decoding image memory 12, and the write speed to each of the line memories 14 and 15, in the first and second embodiments, are performed by the fact that the plurality of speeds equal to or more than m/n times the output data speed are suitably set, it is possible to perform the letter-box transformation processing. Such embodiment is shown in FIG. 5.

Figure 5:
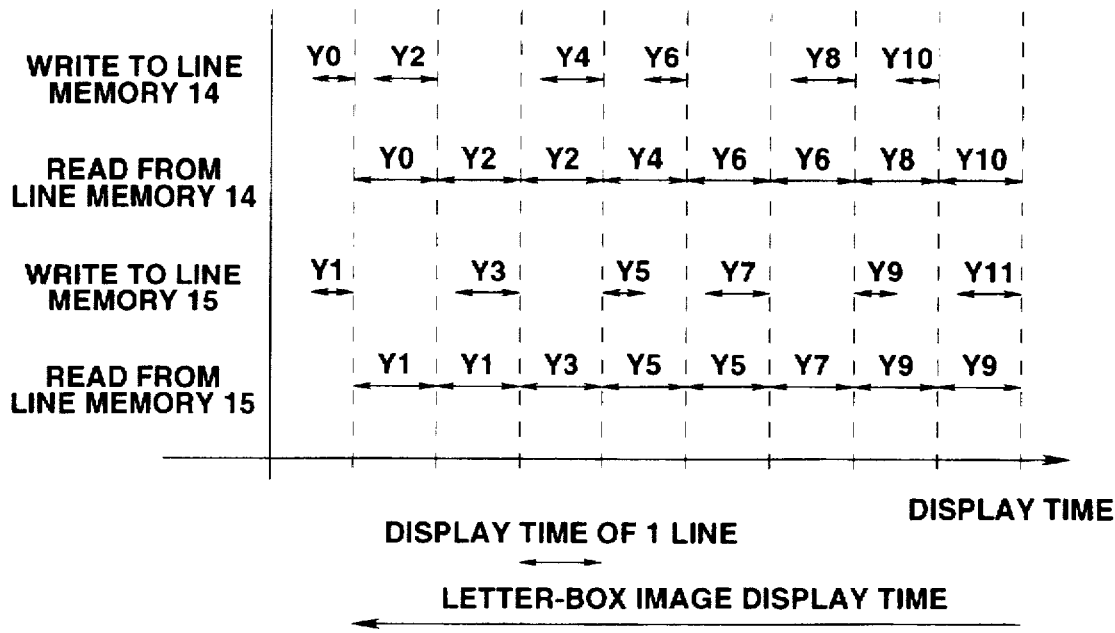
FIG. 5 is an explanatory view of a third embodiment of the letter-box transformation device relating to the present invention.

FIG. 5 shows a third embodiment of a letter-box transformation device relating to the present invention, and is an explanatory view for describing write and read control operation. In this connection, the marks and signs shown in FIG. 5 are shown by a description or illustration method similar to that in FIG. 2.

The present embodiment is formed by circuit arrangements similar to those of the embodiment shown in FIG. 1, and is different from the first and second embodiments in that the read speed of the line data due to the read control circuit 13, and the write speed to the line memories 14 and 15 due to the write control circuit 16 are suitably operated at a plurality of speeds equal to or more than m/n times the output data speed respectively in accordance with the lines (2 times or 4/3 times, for example), whereby the letter-box processing is performed.

As shown in FIG. 5, the read control circuit 13 performs control such that the data for the m lines are read at a high speed from the decoding image memory 12 within the output time of the n (n<m) line data, to give the same to each of the line memories 14 and 15. In this case, the read control circuit 13, for example, suitably reads the data such that the write speed of each of the line memories 14 and 15 is twice or 4/3 times, for example, the read speed of each of the line memories 14 and 15 in accordance with the lines and, simultaneously, writes the same alternatively to each of the line memories 14 and 15 by the write control circuit 16.

For example, the read control circuit 13 reads the line data of the start line Y0 of the number of effective scanning lines from the decoding image memory 12 at a speed twice the read speed of the line memory 14 and, simultaneously, performs write by the write control circuit 16. After optional time thereof, the line data of the line Y2 are read at the speed 4/3 times and, simultaneously, write is performed. In this manner, it is controlled such that the line data are written to the line memory 14 at the speed suitably twice or 4/3 times in accordance with the lines every optional time. Line memory 15 it is controlled such that the line data are written to the line memory 15 by the read control circuit 13 and the write control at the speed suitably twice or 4/3 times in accordance with the lines every optional time. The write at the speed 4/3 times is so controlled as not to outrun the read address.

Regarding the read of the line data from these two line memories 14 and 15, the written line data for the line are simultaneously read at the display time of the 1 line by the read-address control circuit 17. In this manner, the read control due to the read-address control circuit 17 is performed whereby the output line data of the line memory 14 and the line memory 15 can obtain the output line similar to that in the first and second embodiments. Specifically, it is possible to obtain the operation processing results (refer to FIG. 3) similar to those in the aforesaid embodiments, and they can be outputted as the letter-box image data.

According to the present embodiment, it is possible to perform the letter-box transformation processing, because the data for the m lines are read from the decoding image memory 12 within the data output time of the n (n<m) lines. Thus, it is possible to obtain advantages similar to those of the aforementioned embodiments.

In connection with the above, in the first to third embodiment relating to the present invention, the control method has been described as performing control such that the read speed of the line data from the decoding image memory 12 and the write speed to the line memories 14 and 15 are twice or 4/3 times the read speed of the line memory, or these speeds are suitably switched in accordance with the lines to write the same to the line memory. For example, however, if speeds are controlled such that the data for the m lines are read at a high speed within the data output time of the n (n<m) lines, that is, the data are averagely read from the decoding image memory 12 at the speed m/n times the data output speed, it is possible to perform the letter-box transformation processing.

Figure 6:
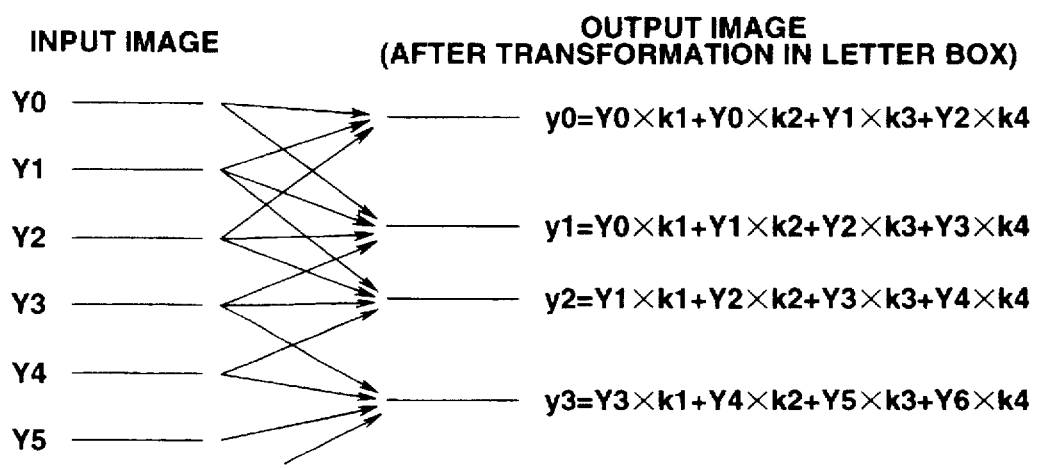
FIG. 6 is an explanatory view when a line memory is used to perform letter-box transformation processing.

Next, the aforesaid first to third embodiments have arranged such that two line memories (p=2) are used to form the letter-box transformation device shown in FIG. 1. Furthermore, however, the operation shown in FIG. 6 is performed to optimize intensity or luminance (in order that the filter characteristic is made satisfactory). In order to perform such operation processing, an embodiment is shown in FIG. 7 when the letter-box transformation device is formed, wherein the line memories are four (p=4).

Figure 7:
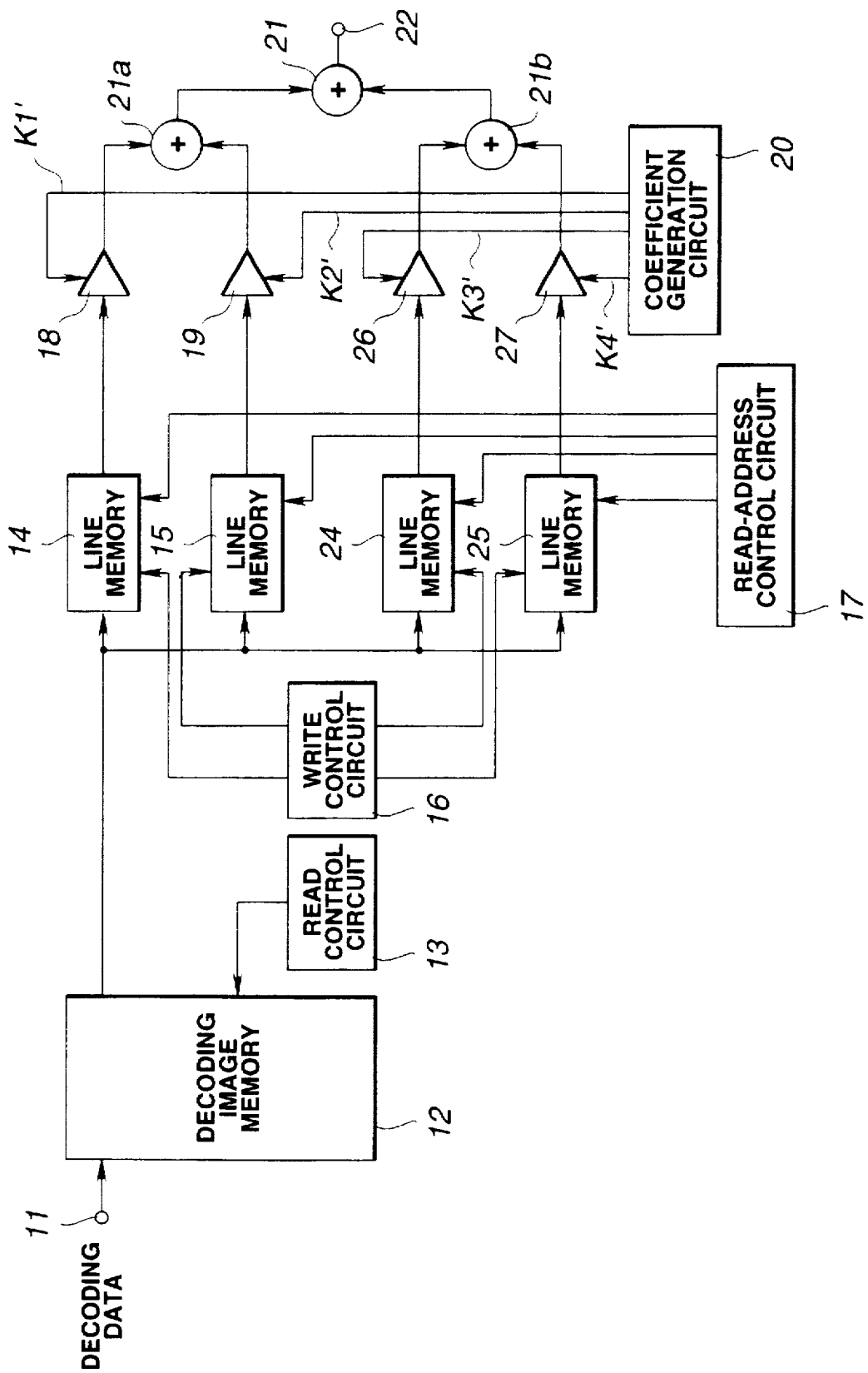
FIG. 7 is a block diagram showing a fourth embodiment of the letter-box transformation device relating to the present invention.
Figure 8:
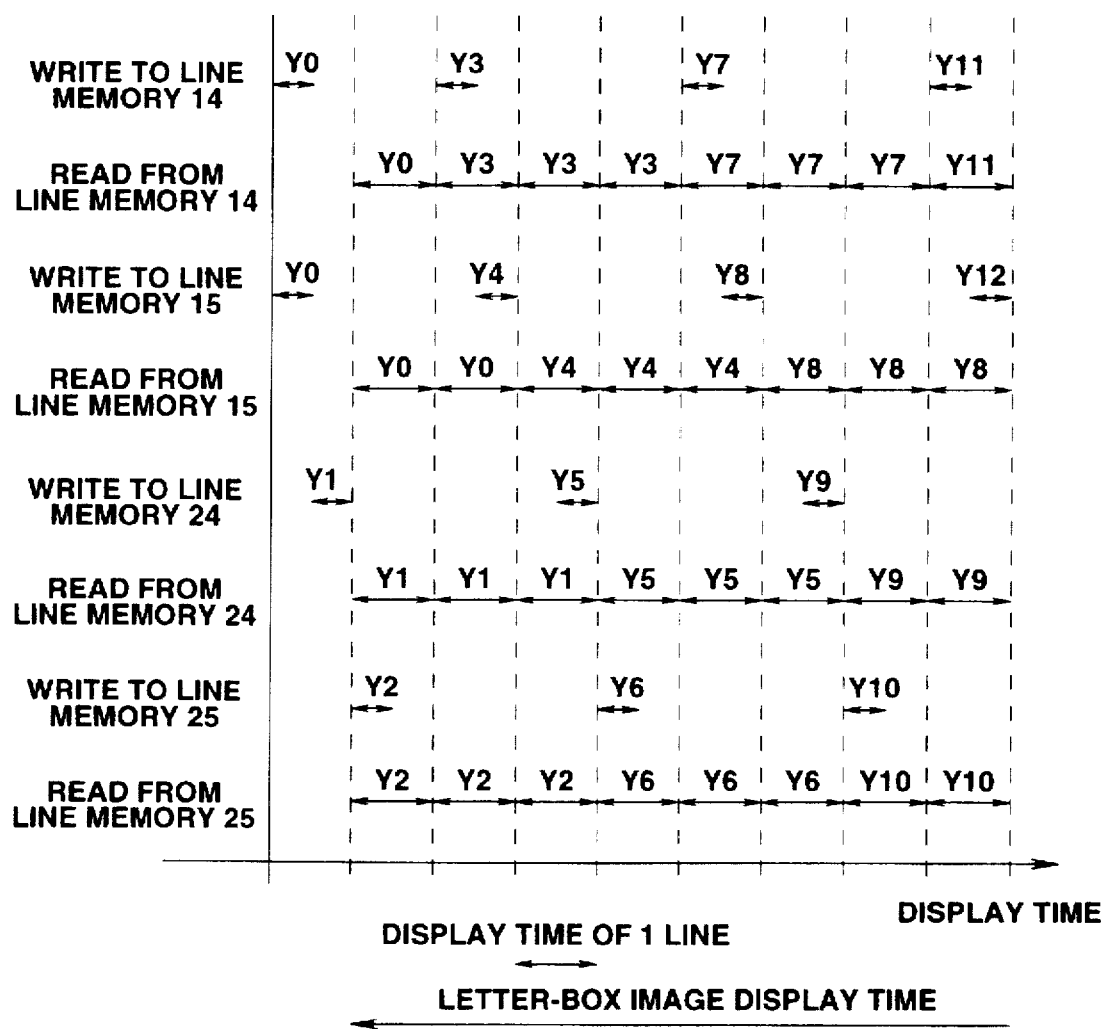
FIG. 8 is an explanatory view for describing write control operation.

FIG. 6 to FIG. 8 show a fourth embodiment of a letter-box transformation device relating to the present invention. FIG. 6 is an explanatory view for describing filter processing in the letter-box transformation processing. FIG. 7 is a block diagram of the letter-box transformation device which is formed by four line memories. FIG. 8 is an explanatory view for describing write control to each of the line memories. In this connection, regarding the device shown in FIG. 7, the same reference numerals are applied to similar elements as those of the device shown in FIG. 1, and the description thereof will be omitted. Moreover, the marks and signs shown in FIG. 8 are shown by a description or an illustration method similar to that in FIG. 2.

The present embodiment is different from each of the aforementioned embodiments in that, in order to make the filter characteristic superior to the aforesaid embodiments and obtain high image quality, four line memories are provided to form the letter-box transformation device.

In order to optimize the filter processing characteristic for the letter-box transformation processing, a 1 line y0 of the letter-box image is created from the lines of at least four input images, as shown in FIG. 6. Specifically, coefficients K1', K2', K3' and K4' for obtaining the number of lines of the letter-box image with respect to the line data including four lines of the inputted image, for example, the line data including the lines Y0, Y1, Y1, Y2, for example, are used to perform multiplication. In this manner, the operation processing on the basis of the letter-box transformation processing is performed.

Accordingly, in order to perform such processing, as shown in FIG. 7, four line memories 14, 15, 24 and 25 are provided. Specifically, in addition to the circuit arrangement of the device shown in FIG. 1, two additional line memories 24 and 25 are provided. Then, multipliers 26 and 27 which are multiplied to the output line data of these line memories 24 and 25 by the use of the predetermined coefficients are added to each other, and an adder 21b for adding the output data of these multipliers 26 and 27 to each other is added. Furthermore, the adder 22 is provided which adds the output data of an adder 21a and the output data of the adder 21b shown in FIG. 7, to each other. In this manner, a group of circuits which is necessary to perform the operation processing shown in FIG. 6 is added. In this connection, the coefficients which are used for each of the multipliers correspond to the coefficient values shown in FIG. 6, and are shown as being K1', K2', K3' and K4'.

On one hand, the read control circuit 13 performs control such that the data for the m lines are read at a high speed from the decoding image memory 12 within the output time of the n (n<m) line data, similarly to the aforesaid embodiments, to give the same to each of the line memories 14, 15, 24 and 25. Thereafter, the write control circuit 16 controls the write such that the write speed of each of the line memories 14 and 15, for example, becomes twice the read speed of each of the line memories 14 and 15, for example.

For example, the read control circuit 13 reads simultaneously the line data of the line Y0 of the number of effective scanning lines from the decoding image memory 12 at a speed twice the read speed of the line memory, to give the same to the line memories 14 and 15. Simultaneously therewith, the write control circuit 16 writes simultaneously the line data of the read start line Y0 respectively to the line memories 14 and 15 at the speed the same as the read speed. Thereafter, the read control circuit 13 reads the line data of the next line Y1 at a twice speed and, simultaneously, writes the same to the line memory 14 by the write control circuit 16. Then, after optional period, the line data of the next line Y2 are read at a twice speed, and are written to the line memory 25. In this manner, control is performed such that the data are successively written to each of the line memories at the timing shown in FIG. 8.

Regarding the read of the line data from these four line memories 14, 15, 24 and 25, the written line data for one line are simultaneously read respectively in the display time of the 1 line, by the read-address control circuit 17. Then, the output line data of each of the line memories 14, 15, 24 and 25 are given to the corresponding multipliers 18, 19, 26 and 27, and are multiplied to the coefficient K1', K2', K3' and K4' which are generated by the coefficient generation circuit 20. The multiplication results of the multipliers 18 and 19 and the multiplication results of the multipliers 26 and 27 are added to each other respectively by the adders 21a and 21b. The addition results of the adders 21a and 21b are added to each other by the adder 22, and are outputted through the output terminal 22 as the letter-box image.

The line data from the output terminal 22 are continuously outputted within the letter-box image display time, whereby, similarly to the aforementioned embodiments, it is possible to obtain the letter-box image data which become the effective lines y0, y1, y2, y3 ... on the basis of the letter-box image.

According to the present embodiment, since the data for the m line are read from the decoding image memory 12 within the data output time of the n (n<m) lines, it is possible to perform the letter-box transformation processing. Thus, advantages similar to those of the aforesaid embodiments are obtained. Further it is possible to obtain the letter-box image having high image quality.

In connection with the above, it has been described that the four line memories (p=4) are used to form the embodiment relating to the present invention. However, even when, for example, the line memories of (p≧3) are used to form the embodiment relating to the present invention, it is possible to obtain similar advantages. In this case, the read control from and the write control with respect to the decoding image memory 12 are changed or modified, and the multiplier and the adder of the operation processing part are added to form the embodiment relating to the present invention, and the read speed from the decoding image memory 12 is performed at a speed averagely m/n times, whereby it is possible to realize the letter-box transformation processing.

In the letter-box transformation device of the present invention, even when memories which are less than the amount of data for the 1 line are used to form the device, in place of the line memory, it is possible to perform the letter-box transformation processing. Such embodiment is shown in FIG. 9 to FIG. 11.

Figure 9:
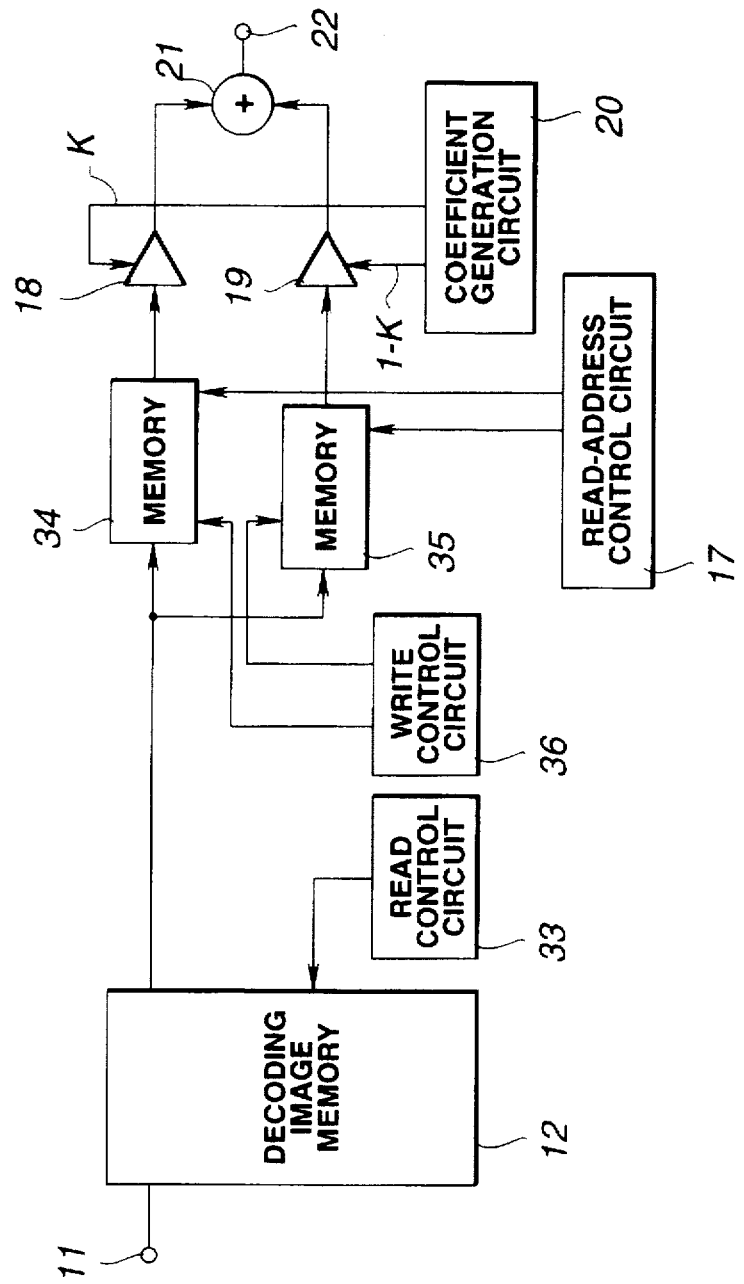
FIG. 9 is a block diagram showing a fifth embodiment of the letter-box transformation device relating to the present invention.
Figure 10:
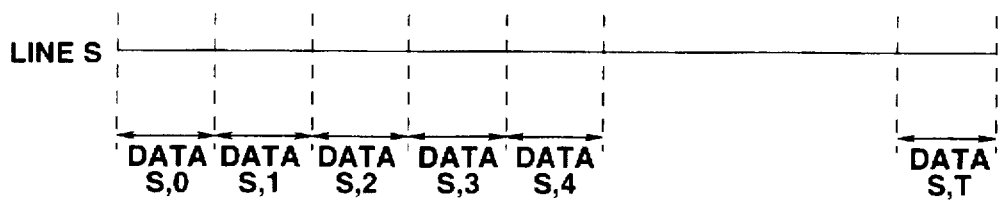
FIG. 10 is an explanatory view for describing read control.
Figure 11:
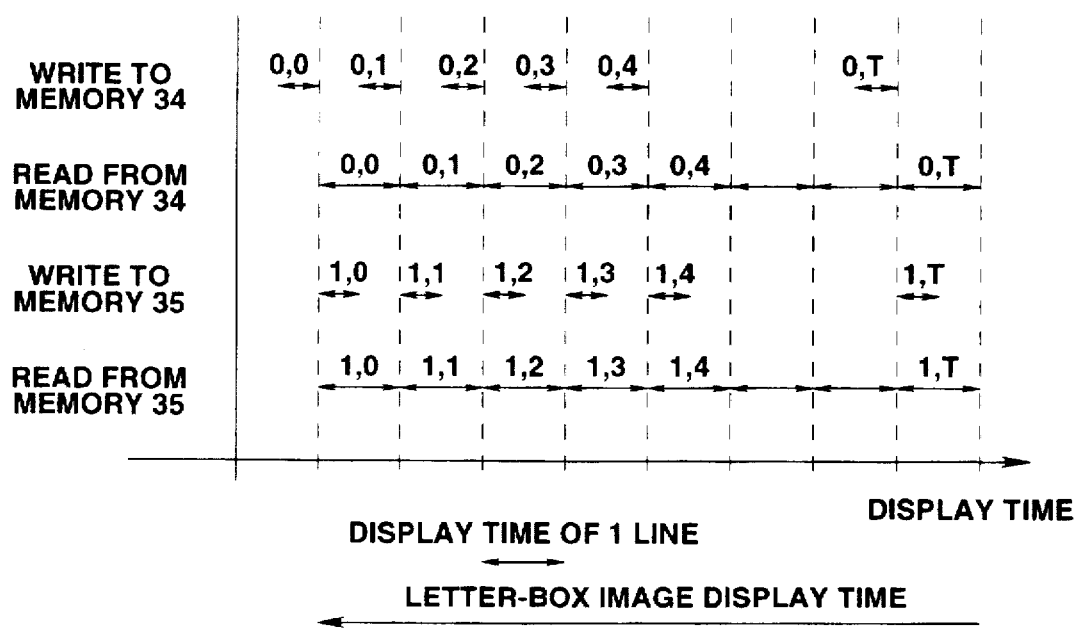
FIG. 11 is an explanatory view for describing operation illustrated in FIG. 9.

FIG. 9 to FIG. 11 show a fifth embodiment of a letter-box transformation device relating to the present invention. FIG. 9 is a block diagram of the device. FIG. 10 is an explanatory view for describing write control with respect to memories. FIG. 11 is an explanatory view for describing operation of the device. In this connection, in FIG. 9, the same reference numerals are applied to constitutional elements the same as those in FIG. 1, and only different portions will be described.

The present embodiment is formed such that memories of q (q indicates the number of memories) which are provided with capacities less than the amount of data for the 1 line, for example, are provided in place of the two line memories which are used in the letter-box transformation device shown in FIG. 1. The present embodiment is different from the aforesaid embodiments in that it is formed such that, by control of a read control circuit 33 and a write control circuit 36, the present embodiment performs control such that data for the 1 line are respectively divided and are respectively written, to thereby perform letter-box transformation processing. In this connection, FIG. 9 shows an example in which q=2.

As shown in FIG. 9, memories 34 and 35 are memories having their capacities less than the amount of data for the 1 line. The memories 34 and 35 store the image data which are read from the decoding image memory 12 by the write control due to the write control circuit 36. Specifically, the read control circuit 33 performs control such that the data for the 1 line are divided into a plurality, from the decoding image memory 12, and a predetermined amount of divided pixel data is read at a high speed, to give the same to each of the memories 34 and 35. The write control circuit 16 controls write such that the write speed of each of the memories 34 and 35, for example, is twice, for example, the read speed of each of the memories 34 and 35.

For example, as shown in FIG. 10, assuming that a predetermined 1 line which is read from the decoding image memory 12 is a line S, the read control circuit 33 reads the line data for the 1 line of the line S every data S, 0; data S, 1; data S, 2; data S; 3, data S, 4; ... data S, T which are a plurality of data units. In this manner, the arrangement is such that the pixel data for the 1 line are read at a high speed by the read control circuit 33 every the data units, and the read data are written alternately to the memories 34 and 35 by the write control circuit 36 every 1 line.

The read-address control circuit 17 reads the line data for the 1 line which are written to each of the memories 34 and 35 simultaneously at the display speed, to give the same to the multipliers 18 and 19 for performing the operation processing. Subsequently, the adder 21 is used similarly to the embodiment shown in FIG. 1 to add the output data of the multipliers 18 and 19 to each other, whereby operation processing results are obtained, and are outputted from the output terminal 22 as the letter-box image.

Next, control operation of the read control circuit 22 and the write control circuit will be described in detail with reference to FIG. 11.

FIG. 11 shows an operation state in read from the decoding image memory when the start line (first line) y0 which is outputted as the letter-box image is created, and in the write control to and in the read control from each of the memories.

The read control circuit 33 divides the data for the 1 line from the decoding image memory 12 every the data units (refer to FIG. 10), and reads the pixel data of the data units which are obtained by division, at a speed twice the read speed (output data speed), for example. Simultaneously, the write control circuit 36 writes the read pixel data of the data units to the memory 34 at a predetermined time interval. Specifically, the data units are respectively read at the period half the display period of the 1 unit data, and are written. Assuming that each of the data units of the line Y0 is 0, 0; 0, 1; 0, 2; 0, 3; 0, 4; ... 0, T, it is possible to write each of the pixel data of the data unit to the memory 34 at the interval of the write period (period half the display period of 1 unit data), as shown in FIG. 11.

Similarly, regarding also the memory 35, each of the pixel data of the data unit of the next line is read by the read control circuit 33 at a speed twice the display speed, and is written simultaneously to the memory 35 by the write control circuit 36. Assuming that each of the data units of the line Y1 is 1, 0; 1, 1; 1, 2; 1, 3; 1, 4; ... 1, T, it is possible to write each of the pixel data of the data units to the memory 35 at the period interval ½ the display time, as shown in FIG. 11. In this manner, the read control circuit 33 alternately reads the unit data every lines and, simultaneously, the write control circuit 36 performs control such that the respective data every the data units are alternately written successively with respect to each of the memories 34 and 35.

Regarding the read of each of the memories 34 and 35, the respective unit data are read simultaneously in the display period of the 1 unit data, by the read-address control circuit 17, and are given to the corresponding multipliers 18 and 19. Then, the multipliers 18 and 19 and the adder 21 are used to perform the operation processing, whereby it is possible to create the line data of the line y0 in the letter-box image. Further, also regarding the output line data subsequent to the next line y1, the line position of the read data unit is changed and is similarly read every the data unit, whereby it is possible to create the same. Thus, even when two memories of the order of the amount of data of the data unit which is read from the decoding image memory 12 are used, it is made possible to perform the letter-box processing.

In this manner, according to the present embodiment, even when the two memories having respective capacities smaller than the amount of data of the 1 line, in place of the line memory, are used to form the letter-box transformation device, it is possible to perform the letter-box transformation processing. Since it is formed by the memory having the capacity sufficiently smaller than the line memory, the present embodiment has such advantages that the device scale can be reduced more than the first to fourth embodiments to reduce the cost.

In connection with the above, in the fifth embodiment of the present invention, the letter-box processing has been described. However, if it is assumed that the m lines from the decoding image memory 12 are transformed to the line number of the n lines, one line memory's made unnecessary to perform the processing, not only, when the relation of n<m, but also when the vertical direction is enlarged.

Moreover, in the present embodiment, the case has been described where the two memories in which q=2 are used. However, when the memories are q>3, the read speed is made q times the output data speed whereby it is possible to perform similar processing, and it is possible to obtain advantages similar to those of the present embodiment.

The image memory, which is provided on a decoder such as the MPEG, has been considered to use the decoding image memory 12. In the MPEG, as described above, the inter-frame compression is also employed, in addition to the intra-frame compression. In the intra-frame coding, the image data of the predetermined frame are DCT-processed as they are and are performed in coding. Furthermore, in the inter-frame coding, the predictive coding is employed in which only the difference data between the image data of the predetermined frame and the reference image data of the frames before and behind this frame are DCT-processed and are performed in coding.

A predictive coding method includes forward predictive coding in which the reference image data viewed forward in time are compensated in motion to determine a predictive error, rearward predictive coding in which the reference image data viewed backward in time are compensated in motion to determine a predictive error, and bidirectional predictive coding which uses the average in either direction or in both directions, in consideration with the coding efficiency.

Since the frame which is performed in coding by the intra-frame coding (hereinafter referred to as "an I picture") is performed in coding only by the intra-frame information, the frame is capable of being decoded only by independent coding data. Accordingly, the arrangement is such that, in an MPEG standard, one I picture is inserted into a fixed period or a fixed cycle (12 frame, for example). In the MPEG standard, the inter-frame coding frame (hereinafter referred to as "a P picture") is obtained by the forward predictive coding which uses this I picture. In this connection, the P picture is also obtained by the fact that the forward P picture is performed in forward prediction coding. Moreover, the bidirectional predictive adaptation change-over frame (hereinafter referred to as "a B picture") is obtained by the bidirectional predictive coding which uses the I and P pictures in either one direction or in both directions of the forward and the rearward.

Figures 12A, 12B, 12C:
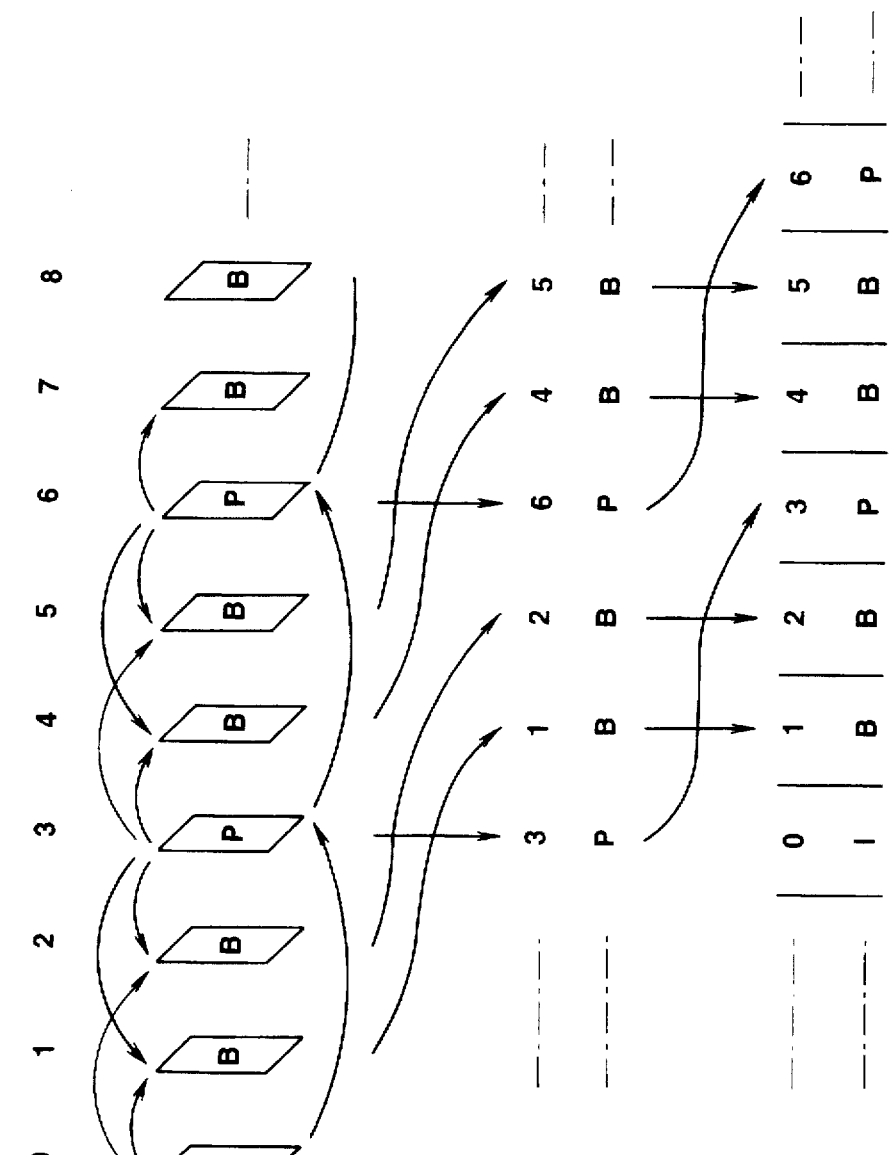
FIG. 12A to FIG. 12C are explanatory views for describing predictive coding.

FIG. 12A to FIG. 12C are explanatory views for describing a compression method of the MPEG system. FIG. 12A shows inputted frame images. FIG. 12B shows coding data. FIG. 12C shows decoding data.

A frame image whose frame number is 0 is performed in intra-frame coding. This frame image is used as a reference image to perform in forward predictive coding the frame image whose frame number is 3. Arrows in FIG. 12A show a predictive direction of such coding. A frame image whose frame number is 6 is also performed in forward predictive coding with the forward frame image whose frame number is 3 serving as the reference image. Further, frame images whose frame numbers are 1 and 2 are performed in bidirectional predictive coding with the frame images whose frame numbers are 0 and 3 serving as the reference image. Moreover, frame images whose frame numbers are 4 and 5 are performed in bidirectional predictive coding with the frame images whose frame numbers are 3 and 6 serving as the reference image.

Specifically, as shown in FIG. 12B, first, the image data whose frame number is 0 are performed in intra-frame coding to obtain the I picture. In this case, the image data whose frame number is 0 are framed by a memory or the like, and are blocked every 8 pixels×8 lines, and DCT processing is applied thereto by a block unit. A DCT transformation coefficient which is obtained by the DCT processing is quantized by the use of a predetermined quantization coefficient and, thereafter, variable-length coding is applied thereto to obtain coding data.

Since, the next inputted frame image frame number is 1, the bidirectional predictive coding is performed which uses the frame images whose frame numbers are 0 and 3. The inputted frame image whose frame member is 1 is held or retained in the memory until the frame image whose frame number is 3 is performed in coding. Similarly, the frame image whose frame number is 2 is performed in coding after coding of the frame image whose frame number is 3. Regarding the frame image whose frame number is 3, the forward predictive coding which uses the frame image whose frame number is 0, as the reference image, is performed to obtain the P picture (FIG. 12B). Specifically, the image data whose frame number is 0 are compensated in motion by the use of a motion vector, and a difference (predictive error) between the reference image data which are compensated in motion and the image data of the present frame (frame whose frame number is 3) is processed in DCT. It is similar to that at the time of the intra-frame coding to quantize the DCT transformation coefficient and, thereafter, to perform variable-length coding.

Next, the I picture and the P picture whose frame numbers are 0 and 3, which have already been performed in coding, are used and the frame images whose frame numbers are 1 and 2 are successively performed in the bidirectional predictive coding. Thus, as shown in FIG. 12B, two B pictures are obtained. Subsequently, as shown in FIG. 12B, coding is performed in order of the frame images whose frame numbers are 6, 4, 5, . . . , to obtain the P picture, the B picture, the B picture, . . . .

In this manner, at the time of coding, coding is performed in frame order which is different from the actually inputted frame order. At the time of decoding, it is necessary that the decoding order of the coding data is returned to the original to output the decoding data in order of the fact that the frame numbers are 0, 1, 2, . . . .

Further, the reference image of the forward frame is used to perform decoding of the P picture. A memory for the frame for holding the reference image is necessary for the decoding. Moreover, the reference images of the forward and rearward frames are used to perform decoding of the B picture. A memory for two frames for holding these reference images is necessary. Moreover, in view of the fact that the coding processing is performed in the DCT block unit, a memory for one frame is necessary which frames the decoding data to enable an interlace display or a non-interlace display. In this case, the decoding data of the I and P pictures are stored in two frame memories in order to be used as the reference image of the B picture. Read from these two frame memories is controlled and is outputted whereby it is possible to use the frame memory for the reference image, in common, as that for the frame. Since, however, the decoding data of the B picture are not used as ones for the reference image and are not stored in the frame memory for the reference image, it is necessary to provide a frame memory exclusive for the framing.

Figure 13:
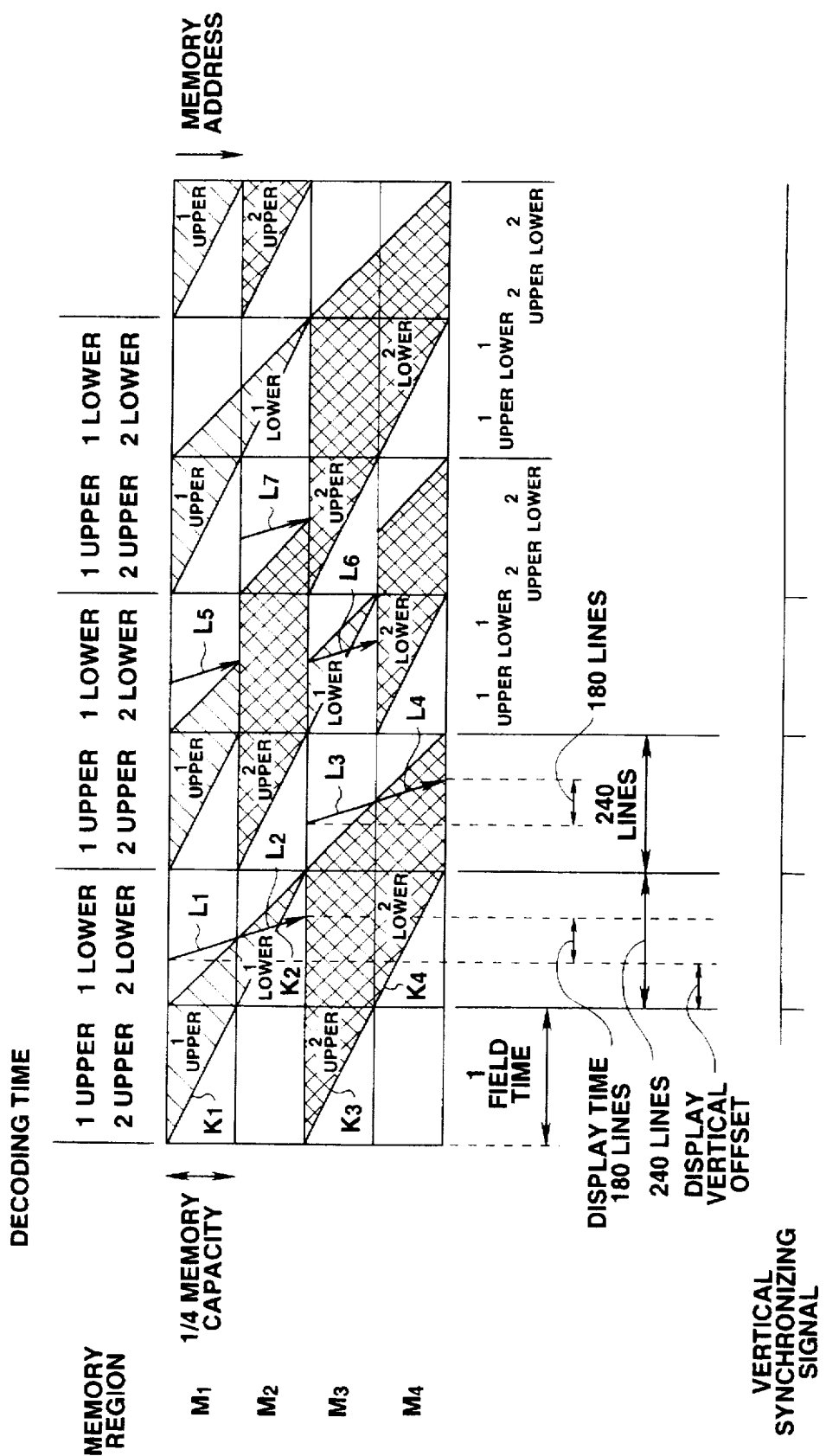
FIG. 13 and FIG. 14 are explanatory views for describing high-speed read from a decoding image memory.

As the above-described decoding image memory 12, these frame memories for the reference image or for the framing are used. FIG. 13 is an explanatory view for describing write and read of the decoding data with respect to this decoding image memory 12. In this connection, FIG. 13 shows operation when an interlace output is obtained.

The decoding image memory 12 has four regions including M1 to M4. In order to use the memory for one frame to interlace the image data of the frame to output the same, it is necessary to perform write and read simultaneously. Then, the arrangement is such that the image data of 2 frame are divided into four regions M1 to M4, to control the write and the read of all regions.

Figure 14:
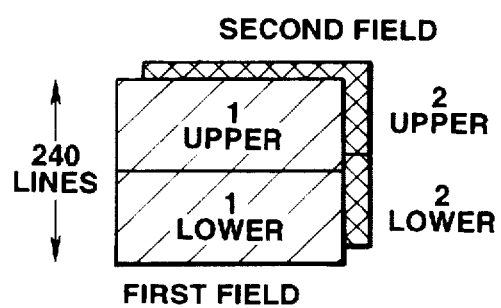

Now, it is assumed that the data are read from the decoding image memory 12 at a read speed the same as the display speed. As shown in FIG. 14, it is assumed that the decoding data of the first field are divided vertically of the image plane so as to be made to data 1 upper and data 1 lower, respectively. Furthermore, it is also assumed that the decoding data of the second field are divided vertically of the image plane so as to be made to data 2 upper and data 2 lower, respectively. First, the data 1 upper and the data 1 lower are stored respectively in the regions M1 and M2, and the data 2 upper and the data 2 lower are stored respectively in the regions M3 and M4.

When the coding data coded by a frame arrangement are decoded, the decoding data are successively outputted in the block unit from the first block line corresponding to the upper end of the image plane to the block line corresponding to the lower end of the image plane. Specifically, the data 1 upper and 2 upper are decoded in the 1 field time, and the data 1 lower and 2 lower are decoded in the next 1 field period. The abscissa in FIG. 13 indicates the decoding time and the output time in the field unit, while the ordinate indicates the memory addresses of the regions M1 to M4 of the decoding image memory 12. A capacity of each of the regions M1 to M4 is ¼ all the capacity of the decoding image memory 12.

In the first 1 field period of time, the decoding data 1 upper and 2 upper which are inputted through the input terminal 11 are written successively to the memories M1 and M3, respectively. Oblique lines K1 and K3 in FIG. 13 indicate write to the regions M1 and M3. The amount of data of the data 1 upper and 2 upper is ¼ the 1 frame, and is written to all the area of the regions M1 and M3 in the 1 field period of time.

In the next 1 field period of time, the decoding data 1 lower and 2 lower which are inputted through the input terminal 11 are written successively to the memories M2 and, respectively. Oblique lines K2 and K4 in FIG. 13 indicate write to the regions M2 and M4. The amount of data of the data 1 lower and 2 lower is ¼ the 1 frame, and is written to all the area of the regions M2 and M4 in the 1 field period of time.

Further, in this field period of time, read is performed from the region M1. The oblique line R1 in FIG. 13 indicates read from the region M1. The data are read from the region M1 in write order so that all the data 1 upper which are stored in the region M1 are read in the half field period of time. In connection with this, an oblique-line region and a net-line region in FIG. 13 indicate that the data are stored in predetermined addresses of the decoding image memory 12. Moreover, the oblique line R2 in FIG. 13 shows that the data 1 lower which are stored in the region M2 are also read, in the latter half of this field period of time. The data 1 upper and 1 lower which are read in this field period of time are outputted as data of the first field.

In the first half of the next field period of time, the data 2 upper which are written to the region M3 in the period of the oblique line K3 are read (oblique line R3). In the latter half, the data 2 lower which are written to the region M4 in the period of the oblique line K4 are read (oblique line R4). Thus, the data 2 upper and 2 lower are outputted as data of the second field.

Subsequently, similarly, so that the use regions of the memory do not overlap, for example, data 2 upper and the data 1 lower, write and read are repeated while the write regions are changed between the regions M2 and M3. Thus, the decoding output of all frames is transformed to the interlace output of all fields and is outputted.

As described above, in each of the aforesaid embodiments, the data are read from the decoding image memory 12 at the read speed twice the display speed, for example. Arrowed oblique lines L1, L2, ... in FIG. 13 show read in such letter-box processing. In this connection, memory addresses which are shown by the axis of ordinate in FIG. 13 correspond to the lines, indicating a state in which the line data are written or are read successively by the oblique lines showing the write and the read.

For example, with respect to the data 2 upper and 2 lower which are written at timing of the oblique lines K3 and K4, read is started from the vertical synchronizing signal so as to be delayed only by the display vertical offset period of time. The read is completed in the period of time 4/3 the 1 field period of time, that is, in the scanning time of 180 lines. The read is shown by the arrow oblique lines L3 and L4.

Similarly, for example, regarding the data 1 upper and 1 lower which are written at the timing of the oblique lines K1 and K2, it is necessary to perform the read which is shown by the arrow oblique lines L1 and L2. However, the read which is shown by the arrow oblique line L2 precedes with respect to the write shown in the oblique line K2. Specifically, when the write and the read in FIG. 13 are performed, regarding the data 1 lower, the read precedes more than the write so that it is impossible to obtain an exact image signal. That is, when the data are read from the decoding image memory 12 at the m/n times the display speed, like the first to fifth embodiments, regarding the line data on the lower side of the image plane of each of the fields, the read precedes more than the write so that it is impossible to perform the read.

Accordingly, when the frame memory for framing which is employed in the MPEG decoder is used as the decoding image memory 12, to perform the line-number transformation processing the memory capacity of the decoding image memory 12 increases so that the read is prevented from preceding the write. In this connection, it is apparent that, when the decoding speed of the MPEG decoder is high, and the image data of 1 field can be written to the decoding image memory 12 at the period of time shorter than the 1 field period of time, it is unnecessary to increase the memory capacity.

Figure 15:
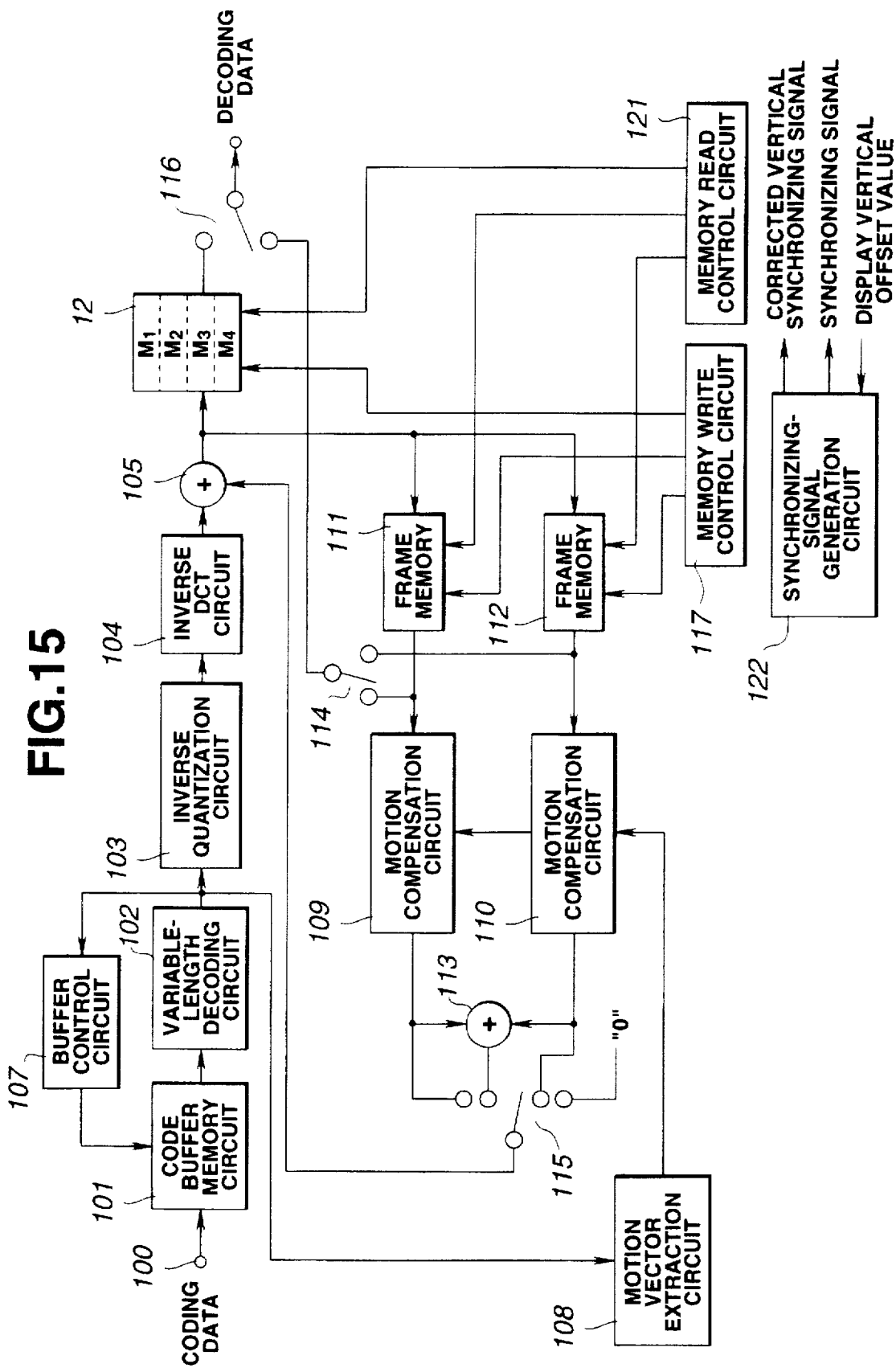
FIG. 15 is a block diagram showing a sixth embodiment of the letter-box transformation device relating to the present invention.

FIG. 15 relates a sixth embodiment of the present invention. When the write speed to the decoding image memory 12 is the same as the display speed, the high-speed read from the decoding image memory 12 is possible without increasing the memory capacity of the decoding image memory 12. FIG. 15 is an example applied to the MPEG decoder.

The coding data of the MPEG standard are inputted to an input terminal 100. These coding data are supplied to a code buffer memory circuit 101. These coding data are created by the DCT processing, the quantization processing. Further, the variable-length coding processing, and coding date have the I picture due to the processing within the frame, the P picture which uses the reference image of the forward or the rearward frame, and the B picture which uses the reference image of the bidirectional frame. Furthermore, the coding data include information of the motion vector which is used when the P and B pictures are created. In this connection, the DCT processing is performed in the block unit which is obtained by blocking after framing.

The coding buffer memory circuit 101 holds the inputted coding data and performs time setting between decoding processing time and output processing time, to output the same. An output of the coding buffer memory circuit 101 is given to a variable-length decoding circuit 102. The variable-length decoding circuit 102 returns the inputted coding data to the data prior to the variable-length coding processing on the side of the coding, by the variable-length decoding processing, to output the same to a buffer control circuit 107, an inverse quantization circuit 103 and a motion vector extraction circuit 108. The buffer control circuit 107 is so arranged as to control the coding buffer memory circuit 101 on the basis of the output from the variable-length decoding circuit 102.

The motion vector extraction circuit 108 extracts a motion vector which is included in the variable-length decoding output to output the same to motion compensation circuits 109 and 110, regarding the P and B pictures. The inverse quantization circuit 103 processes, in inverse quantization, the inputted data to give the same to an inverse DCT circuit 104. The inverse DCT circuit 104 processes in inverse DCT the inverse quantization output to output the same to an adder 105.

An output of a switch 115 is also given to the adder 105. The switch 115 gives 0 to the adder 105 when the output of the inverse DCT circuit 104 is based on the I picture. The switch 115 gives an output of one of the motion compensation circuits 109 and 110 to be described later, to the adder 105, when the output of the inverse DCT circuit 104 is based on the P picture. The switch 115 gives the output, to the adder 105, from each of the motion compensation circuits 109 and 110 or an output from an adder 113 to be described later when the output of the inverse DCT circuit 104 is based on the B picture. The adder 105 adds the output from the inverse DCT circuit 104 and the output from the switch 115 to each other to thereby restore the image, to output the same to the reference-image memory 12 and frame memories 111 and 112.

Write and read are controlled by a memory write control circuit 117 and a memory read control circuit 121 so that the frame memories 111 and 112 hold restored image data of the I and P pictures which become the reference image. The frame memories 111 and 112 are so arranged that the reference image data which are held at the decoding timing of the corresponding P and B pictures are outputted to the motion compensation circuits 109 and 110. The motion compensation circuits 109 and 110 compensate, in motion, the reference image data from the respective frame memories 111 and 112 on the basis of the motion vector from the motion vector extraction circuit 108, to output the same. Outputs from the motion compensation circuits 109 and 110 are supplied to the switch 115, and are supplied also to the adder 113. The adder 113 is so arranged as to add the outputs from the motion compensation circuits 109 and 110 to each other in accordance with the predictive mode to output the same to the switch 115.

The decoding image memory 12 is divided into four memory regions M1 to M4. The regions M1 to M4 have respective capacities each of which is one forth the capacity which stores the image data for 1 frame (hereinafter referred to as "frame capacity"). The arrangement is such that write and read are controlled by the memory write control circuit 117 and the memory read control circuit 121 so that the decoding image memory 12 stores the decoding data of the B picture which are inputted successively, and reads the same in interlace order to output the same to a switch 116.

On one hand, the arrangement is such that, regarding the I and P pictures, the restored image data which are stored in the frame memories 111 and 112 are used as the interlace output. The frame memories 111 and 112 are such that write and read thereof are controlled by the memory write control circuit 117 and the memory read control circuit 121, and the stored restored image data are read in the interlace order and are outputted to a switch 114. The switch 114 is changed over in accordance with the output frame order of the image, and outputs the image data from the frame memories 111 and 112 to the switch 116. The arrangement is such that the switch 116 is changed over in accordance with the output frame order of the image, to output the restored image data of a series of frames, as the decoding data.

A synchronizing-signal generation circuit 122 generates horizontal and vertical synchronizing signals which are synchronized with the video signal which is obtained by decoding of the inputted coding data. In the present embodiment, a display vertical offset value is also inputted to the synchronizing-signal generation circuit 122. The arrangement is such that the synchronizing-signal generation circuit 122 can delay the vertical synchronizing signal by the delay time on the basis of the display vertical offset value to be able to output the same as a corrected vertical synchronizing signal.

The memory write control circuit 117 and the memory read control circuit 121 are so arranged as to control write and read of the decoding image memory 12 and the frame memories 111 and 112 with the synchronizing signal or the corrected synchronizing signal from the synchronizing-signal generation circuit 122 serving as a time reference.

Figure 17:
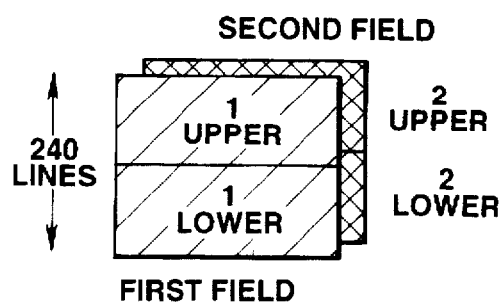
Figure 18:
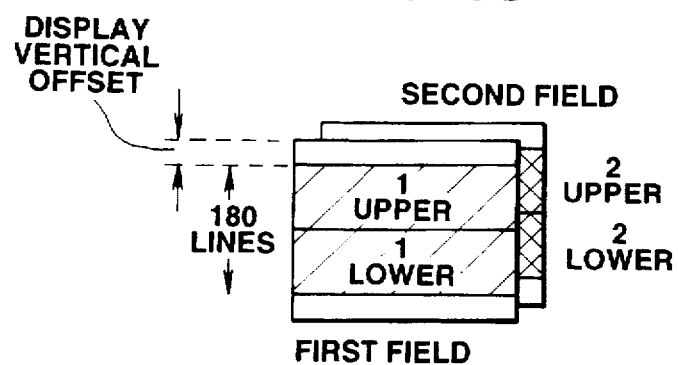

Next, operation of the embodiment will be described with reference to FIG. 16 to FIG. 20. FIG. 16 shows write and read of the decoding image memory 12, together with the vertical synchronizing signal and the corrected vertical synchronizing signal. FIG. 17 and FIG. 18 show a method of dividing the image data for 1 image plane. In this connection, in FIG. 16 to FIG. 18, the data of the odd fields are shown by oblique lines, and the data of the even fields are shown by net lines.

Decoding processing is similar to a generic MPEG decoder. Specifically, coding data are inputted to the coding buffer memory circuit 101. The coding data have the I, P and B pictures. It is assumed that, for example, the I, P and B pictures are inputted in frame order in FIG. 12B. The coding buffer memory circuit 101 holds the inputted coding data to output the same to the variable-length decoding circuit 102, in consideration of the coding processing time and the output time.

The coding data are performed in variable-length decoding by the variable-length decoding circuit 102, are inverse-quantized by the inverse-quantization circuit 103, are processed in inverse DCT by the inverse DCT circuit 104, and are returned to data prior to the DCT processing on the side of coding so as to be supplied to the adder 105. In this connection, these processings are performed in a block unit.

When the inputted coding data are ones in which the I picture is performed in coding, the switch 115 gives 0 to the adder 105. Thus, the adder 105 outputs the output of the inverse DCT circuit 104 to the frame memory 112 as it is. By the frame memory 112, the decoding data of each of the blocks are stored for 1 frame. In predetermined output timing, the decoding data are read in display order, and are outputted through the switches 114 and 116.

When the inputted coding data are ones in which the P picture is performed in coding, the output of the variable-length decoding circuit 102 is given also to the motion vector extraction circuit 108. By the motion vector extraction circuit 108, the motion vector which is included in the coding data of the P picture is extracted, and is given to the motion compensation circuit 110.

The frame memory 112 holds the decoding data of the I picture as the reference image. The motion compensation circuit 110 reads the data of the frame memory 112 and compensates in motion the same by the use of the motion vector. These data of the reference image which are compensated in motion are given to the adder 105 through the switch 115. The output of the inverse DCT circuit 104 is a decoded predictive error. The adder 105 adds the data of the reference image from the switch 115 to this predictive error to thereby restore the image data. These image data are stored in the frame memory 111.

Next, it is assumed that the coding data on the basis of the B picture are inputted. Also in this case, the output of the variable-length decoding circuit 102 is given to the inverse quantization circuit 103 and the inverse DCT circuit 104, and is given also to the motion vector extraction circuit 108. From the inverse DCT circuit 104, the predictive error prior to the DCT processing is outputted to the adder 105. On one hand, the motion vector extraction circuit 108 extracts the motion vector which corresponds to the reference image, from the variable-length decoding output, respectively to output the same to the motion compensation circuits 110 and 109. In this connection, there is also case where only either one of the motion vectors is extracted, depending upon the predictive mode.

The frame memories 112 and 111 hold the restored image data of the I picture and the P picture, respectively, as the reference image data. The motion compensation circuits 109 and 110 read these restored image data, compensate in motion the same on the basis of the motion vector, and output the same to the switch 115 and the adder 113. Specifically, the motion compensation circuits 109 and 110 correct the block position corresponding to the decoding data of the predetermined block which are outputted from the inverse DCT circuit 104, by the motion vector, and output the block data at the corrected block position as the reference image data which are compensated in motion. The adder 113 adds the outputs of the motion compensation circuits 109 and 110 to each other to output the same to the switch 115. The switch 115 selects the output of the motion compensation circuit 110 when the predictive direction is forward, and selects the output of the motion compensation circuit 109 when the predictive direction is rearward. When the predictive direction is both the directions, the switch 115 selects the output of the adder 113 and outputs the same to the adder 105 as the reference image data which are compensated in motion.

Thus, the adder 105 adds the block data from the inverse DCT circuit 104 and the reference image data of the block unit from the switch 115 to each other, to restore the image data of the B picture by each of the block units to output the same to the frame memory 6.

The block data from the adder 105 are outputted in the block unit. Specifically, from the adder 105, the data of the B picture are outputted successively in the block unit from the block line at the upper end of the image plane to the block line at the lower end of the image plane. From the adder 105, first, the image data 1 upper and 2 upper in FIG. 17 and FIG. 18 are outputted in the predetermined 1 field period. The image data 1 lower and 2 lower are outputted in the next 1 field period.

FIG. 16 shows time of the field unit and shows a memory address corresponding to each of the regions M1 to M4. As shown FIG. 16, at the timing at which the image data 1 upper and 2 upper are outputted from the adder 105, that is, in the T0 period, the memory write control circuit 117 generates successively the addresses which correspond to the regions M1 and M3 of the decoding image memory 12. Thus, as shown by the oblique lines K1 and K3 in FIG. 16, write of the image data 1 upper and 2 upper is performed with respect to the regions M1 and M3 in the 1 field period of the T0 period.

In the next T1 period, the image data 1 lower and 2 lower are outputted from the adder 105. The memory write control circuit 117 successively assigns the addresses corresponding to the regions M2 and M4 at this timing. Thus, as shown in the oblique lines K2 and K4 in FIG. 16, write of the image data 1 lower and 2 lower is performed with respect to the regions M2 and M4.

The oblique line parts in FIG. 16 show a period during which the image data 1 upper and 1 lower are stored in the decoding image memory 12. The net line parts show a period during which the image data 2 upper and 2 lower are stored in the decoding image memory 12. As shown by an oblique line R1 in FIG. 16, the memory read control circuit 121 successively assigns the read address with respect to the region M1 from the start timing of the T1 period. Thus, the image data 1 upper is read from the region M1 by the period first ½ the T1 period and is outputted through the switch 116. In the latter period ½ the T1 period, the read address of the region M2 is assigned by the memory read control circuit 121. The image data 1 lower are read and are outputted.

Specifically, in the T1 period, write shown by the oblique lines K2 and K4 is performed by the memory write control circuit 117, and read shown by the oblique lines R1 and R2 is performed by the memory read control circuit 121.

Similarly, in the T2 period, the read address is assigned with respect to the regions M3 and M4. The image data 2 upper and 2 lower are read in the 1 field period (the oblique lines R3 and R4), while write addresses are assigned with respect to the regions M1 and M2, and the image data 1 upper and 2 upper are written in the 1 field period (the oblique lines K5 and K6). Thus, the image data 1 upper, 1 lower, 2 upper and 2 lower are successively read in the T1 and T2 periods so that the images of the first and second fields are formed.

Moreover, in the T3 period, the read addresses are assigned with respect to the regions M1 and M3. The write addresses are assigned with respect to the regions M3 and M4, while the image data 1 upper and 1 lower are read in the 1 field period (oblique lines R5 and R6), and the image data 1 lower and 2 lower are written in the 1 field period (oblique lines K7 and K8). Subsequently, similar operation is repeated, and write and read are performed with respect to the decoding image memory 12. As shown in FIG. 16, read with respect to the decoding image memory 12 is synchronized with the vertical synchronizing signal. The image on the basis of the image data which are read from the decoding image memory 12 becomes one shown in FIG. 17. In this connection, assuming that the restored image is an NTSC image, a 1 field image plane is formed by 240 lines, as shown in FIG. 17.

Here, it is assumed that the restored image is transformed in line number, and an image is displayed on the center region of the display image plane, for 180 lines, as shown in FIG. 18. In this case, the display vertical offset value which corresponds to a share of 30 lines is supplied to the synchronizing-signal generation circuit 122. The synchronizing-signal generation circuit 122 generates a corrected vertical synchronizing signal in which the vertical synchronizing signal is delayed only by time on the basis of the display vertical offset value and the line-number transformation processing. In the example shown in FIG. 16 and FIG. 18, the corrected vertical synchronizing signal is generated in delay only for time of the scanning time of 180 lines from the write completion timing of the data 1 lower and 2 lower and time prior only to time of the sum of the display vertical offset (scanning time of 30 lines), that is, only for the scanning time of the 30 lines from the vertical synchronizing signal.

The synchronizing-signal generation circuit 122 gives the vertical synchronizing signal to the memory write control circuit 117, and gives the corrected vertical synchronizing-signal to the memory read control circuit 121. The memory write control circuit 117 performs write with respect to the decoding image memory 12 with the vertical synchronizing signal serving as a time reference. Thus, write is performed which is shown in the oblique lines K1, K2, . . . in FIG. 16.

On one hand, the memory read control circuit 121 performs read from the decoding image memory 12 with the corrected vertical synchronizing signal serving as the time reference. Specifically, when the corrected vertical synchronizing signal (refer to FIG. 16) is generated in delay of only the scanning time of 30 lines from the write (oblique line K2) start of the data 1 lower in the T1 period, the memory read control circuit 121 starts read from the region M1 after the scanning time of 30 lines, which corresponds to the display vertical offset (oblique line L1). In this case, since a share of 240 lines is read in the scanning time of 180 lines, the read rate becomes 4/3 times the write rate (display rate). When the scanning time of 90 lines expires from the read start with respect to the region M1, read of the data 1 upper from the region M1 is completed and, then, read of the data 1 lower is performed from the region M2 (oblique line L2).

With respect to the data 1 lower, write is started from the start timing of the T1 period, and write is also performed simultaneously with read of the data 1 lower. For the write of the data 1 lower, the scanning time of 240 lines is required. For the read, the scanning time of 180 lines is required. However, since the write starts preceding only the scanning time of 60 lines more than the read, the read with respect to the data 1 lower does not precede the write (refer to oblique lines K2 and L2).

Thus, the read of the data 1 lower has normally been completed by the scanning time of 90 lines at the end of the T1 period. After the scanning time of 30 lines from the completion of this read, the corrected vertical synchronizing signal is generated. Accordingly, if the image on the basis of the image data 1 upper and 1 lower which are read from the decoding image memory 12 is displayed by the use of the corrected vertical synchronizing signal, the letter-box display is performed which has no-definition parts for 30 lines on an upper part and a lower part of the image plane, and which has a main definition part for 180 lines of a center in the vertical direction, as shown in FIG. 18.

Similarly, read with respect to the image data 2 upper starts at the rate 4/3 times the write, after the scanning time of 60 lines from the start of the T2 period. As shown in the oblique lines K4 and L4, it completes till the read of the image data 2 lower, without the fact that the read does not precede the write. Subsequently, similar operation is repeated, and the image data for the letter-box display as shown in FIG. 18 are restored.

In this manner, the read start timing is delayed on the basis of the display vertical offset and the line-number transformation processing, whereby the read is prevented from preceding the write. The corrected vertical synchronizing signal in which the vertical synchronizing signal is delayed is generated correspondingly to this delay time, and is used in the display, whereby the letter-box display is made possible. Specifically, the read control circuit 13 in the first to fifth embodiments performs the read with the corrected vertical synchronizing signal serving as the time reference, whereby the read at a speed higher than the write speed is made possible. Thus, the display offset processing which includes the line-number transformation processing is possible without the fact that the memory capacity of the decoding image memory 12 increases.

Figure 20:
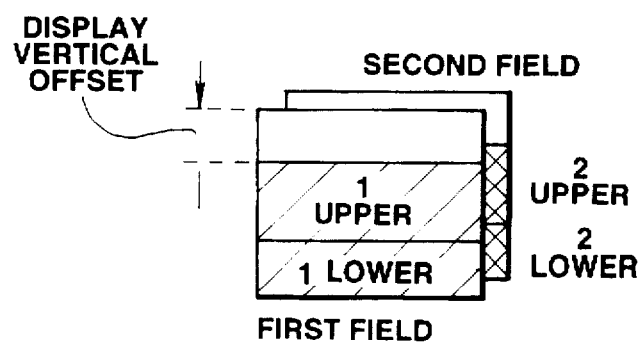

In connection with the above, the present embodiment is applicable not only to the letter-box processing, but also to the case where the display offset is added to merely shift the display position. FIG. 19 and FIG. 20 are explanatory views for describing operation of this case. FIG. 19 corresponds to FIG. 16. FIG. 20 shows a method of dividing the image data of a 1 image plane.

The display vertical offset value on the basis of the start position of the vertical display is given to the synchronizing-signal generation circuit 122. The synchronizing-signal generation circuit 122 generates the corrected vertical synchronizing signal (FIG. 19) which is preceded only by the time corresponding to the display vertical offset value, from the vertical synchronizing signal shown in FIG. 19. The memory write control circuit 117 performs write with respect to the decoding image memory 12 with the vertical synchronizing signal serving as the time reference. Thus, write shown in the oblique lines K1, K2, . . . in FIG. 19 is performed.

On one hand, the memory read control circuit 121 starts the read of the image data from the decoding image memory 12 at the timing which is delayed only time on the basis of the display vertical offset, from the corrected vertical synchronizing signal (timing of the vertical synchronizing signal), and is completed at the timing of the corrected vertical synchronizing signal. Specifically, as shown in FIG. 19, the addresses of the region M1 are assigned successively from the start timing of the T1 period so that the read of the data 1 upper is performed (oblique line O1). In the latter half of the T1 period, the address of the region M2 is assigned to perform read of the data 1 lower. The read of the data 1 lower is completed at the timing of the corrected vertical synchronizing signal, as shown in the oblique line O2 in FIG. 19.

Since the corrected vertical synchronizing signal is generated preceding from vertical synchronizing signal only by the share of the display vertical offset, if the image on the basis of the image data 1 upper and 1 lower which are read from the decoding image memory 12 is displayed by the use of the corrected vertical synchronizing signal, the image is obtained in which the display on the basis of the data 1 upper is started at the position which is low from the upper end of the image plane only by a share of the display vertical offset, as shown in the first field in FIG. 20. In this connection, the lower end of the image is lacking only by the share of the display vertical offset. Thereafter, similar write and read are performed so that display shown in FIG. 20 is performed.

Conversely, if the corrected vertical synchronizing signal is generated in delay by the share of the display vertical offset more than the vertical synchronizing signal, it is also possible to display a portion lower, only by the mount of vertical display offset, than the upper of the image data, on the upper end of the image plane.

The above-described embodiments are the example in which the timing of the synchronizing signal which is regenerated from the video signal is changed. However, when the synchronizing signal is supplied from the outside, the decoding start timing is changed with respect to the timing of the supplied synchronizing signal, whereby it is apparent that similar advantages can be obtained.

Figure 21:
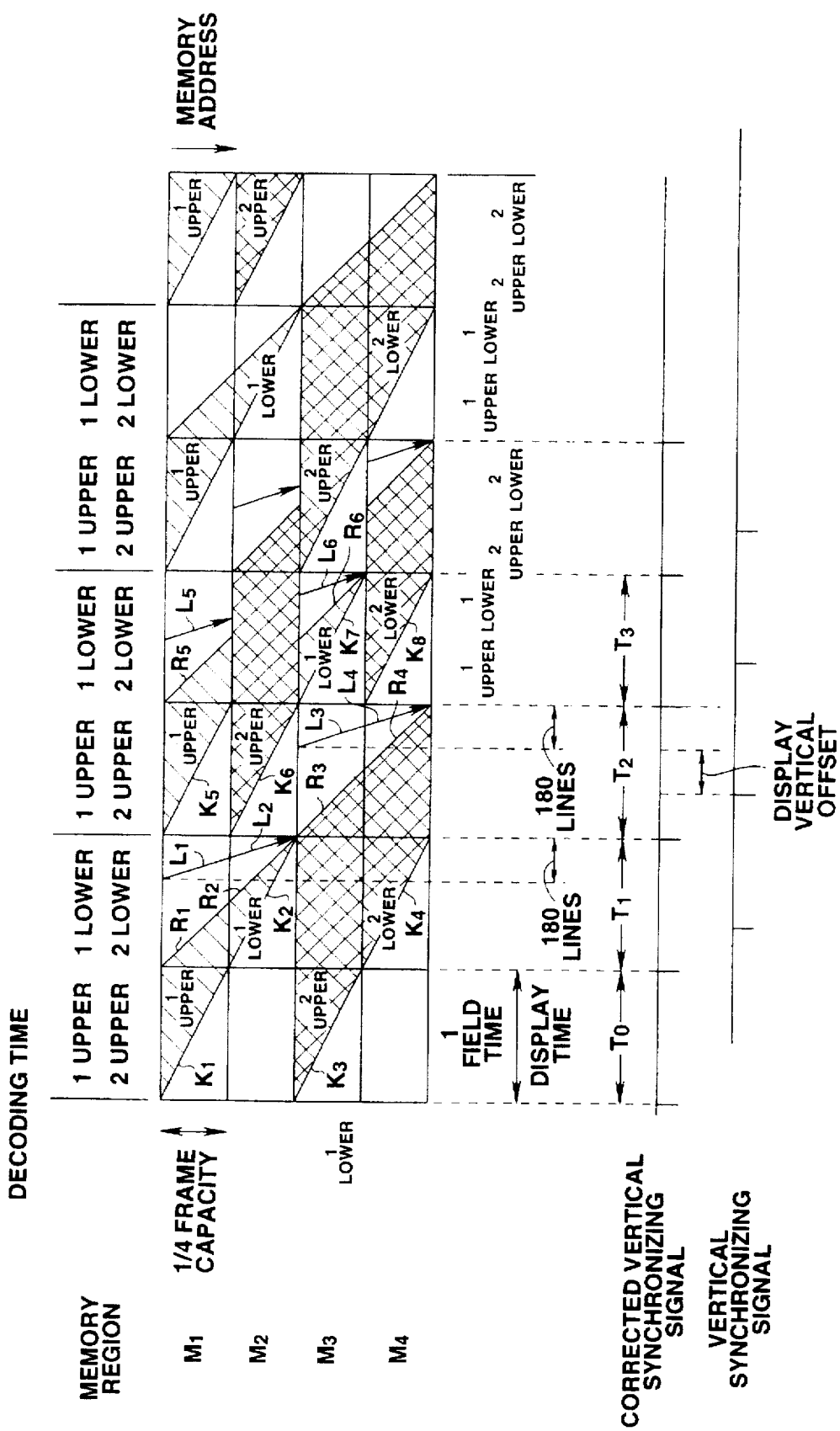
Figure 22:
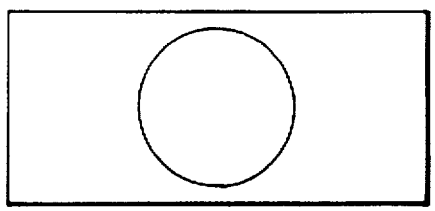
FIG. 22 and FIG. 23 are explanatory views when data having an aspect ratio of 16:9 are displayed on an image plane having 4:3.
Figure 23:
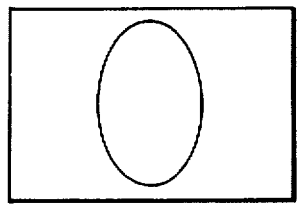
Figure 24:
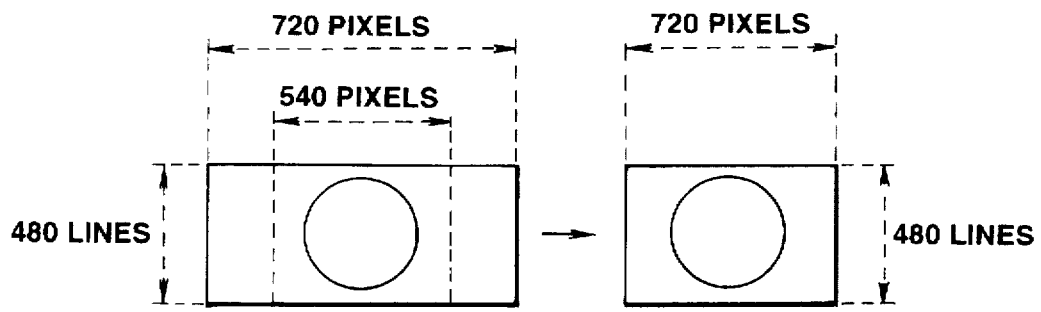
FIG. 24 is an explanatory view of a display method to an image plane having 4:3 due to horizontal pixel transformation.
Figure 25:
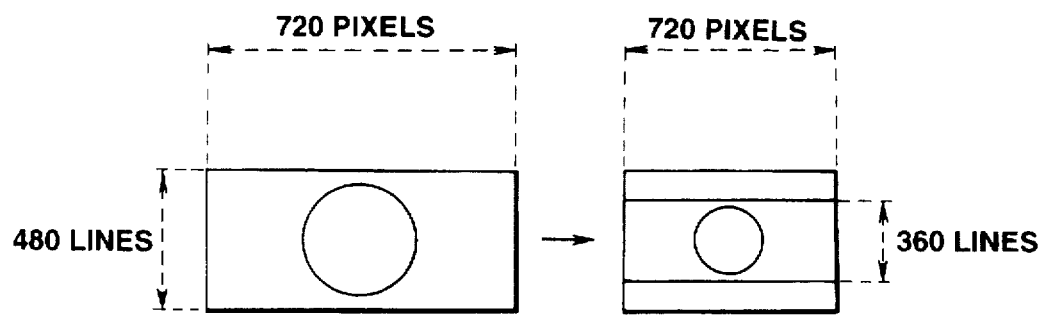
FIG. 25 is an explanatory view of a display method to an image plane having 4:3 due to letter-box processing.

FIG. 21 is an explanatory view for describing operation in this case. FIG. 21 corresponds to FIG. 16.

In this case, the decoding part in FIG. 15 performs decoding with the corrected vertical synchronizing signal serving as the time reference, and performs write to the decoding image memory 12. On one hand, read from the decoding image memory 12 is performed with the vertical synchronizing signal serving as the time reference. Specifically, also when the synchronizing signal is supplied from the outside, it is possible to obtain similar advantages of letter-box processing and display offset.

As described above, the letter-box transformation device relating to the present invention is useful for a decoder which decodes the coding data such as the MPEG or the like. For example, it is suitable for being used in an MPEG 2 decoder LSI which is loaded on a DVD player or the like.

What is claimed is:

1. A letter-box transformation device comprising:

decoding means for performing decoding processing of coding data;

memory means for storing image data from said decoding means;

output means for outputting output image data for a letter-box image, based on read image data from said memory means, in predetermined image display time; and read control means for performing read of said image data from said memory means, at a rate higher than a write rate to said memory means.

2. A letter-box transformation device according to claim 1, wherein said output means comprises:

operation means for applying predetermined operation between lines to said read image data in order to obtain said output image data for said letter-box image; and a memory for storing pixel data of a plurality of lines.

3. A letter-box transformation device according to claim 1, wherein that said read control means causes read of said image data from said memory means to be performed on a read time reference which is different from rewrite time reference of write to said memory means, and which corresponds to said image display time.

4. A letter-box transformation device comprising:

image memory means for storing image data obtained by decoding processing of coding data;

first read control means for reading data for m lines from said image memory means within image display time of n lines, wherein n is less than m, to output the same;

a plurality of line memory means for storing said image data read from said image memory means by said first read control means;

operation processing means for applying predetermined scanning-line-number transformation operation processing to said image data read from said line memory means, to perform scanning-line-number transformation from the m line to the n line;

coefficient generation means for outputting an operation coefficient used in said operation processing means;

write control means for writing said image data read by said first read control means, to said plurality of line memory means, respectively, all lines used in said scanning-line-number transformation operation processing; and second read control means for reading said image data of the line which is used in said scanning-line-number transformation operation processing, from said line memory means, in the image display time of the line, to output the same to said operation processing means.

5. A letter-box transformation device according to claim 4, wherein said first read control means reads the image data for the line from said image memory, in time equal to or less than n/m times the display time of the line.

6. A letter-box transformation device comprising:

image memory means for storing image data obtained by decoding processing of coding data;

first read control means for dividing said image data by the number of lines n times the number of lines required for scanning-line-number transformation operation processing from an m line to an n line, into a predetermined amount of image data units which is less than an amount of image data for one line, within image display time of the n line, to read the same from said image memory to output the same;

a plurality of memory means for storing said predetermined amount of image data read from said image memory by said first read control means;

operation processing means for applying said scanning-line-number transformation operation processing to said predetermined amount of image data read from said plurality of memory means to perform scanning-line-number transformation from the m line to the n line;

coefficient generation means for outputting an operation coefficient used in said operation processing means;

write control means for writing said predetermined amount of image data read by said first read control means, to said plurality of memory means for all lines used in said scanning-line-number transformation operation processing, from said plurality of memory means, in the image display time of said predetermined amount of image data, to output the same to said operation processing means.

7. A letter-box transformation device according to claim 6, wherein the number of memory means corresponds to the number of lines required for said scanning-line-number transformation operation processing and, said first read control means reads said predetermined amount of image data at time equal to or less than twice the image display time of said predetermined amount of image data, from said image memory.

8. A letter-box transformation device according to any one of claims 2–5 wherein a ratio between said m and said n is 4:3.

9. A letter-box transformation method comprising:

first read procedure for reading image data for an m line, stored in an image memory, within image display time of an n line, wherein n<m, to output the same;

first write procedure for storing said image data, read from said image memory, to a plurality of memories used in scanning-line-number transformation operation processing, at a predetermined data unit;

second read procedure for reading said image data from said plurality of memories at a speed corresponding to image display time; and operation procedure for applying predetermined operation processing to said image data read from said plurality of memories, to obtain output image data of a letter-box image.

10. A letter-box transformation method comprising:

write procedure for writing image data, obtained by decoding of coding data, to memory means at predetermined synchronizing timing; and read procedure for reading said; image data stored in said memory means, at a read rate higher than a write rate in said write procedure, at synchronizing timing different from said predetermined synchronizing timing.

11. A letter-box transformation device comprising:

decoding means for decoding input coding data by a predetermined block unit and outputting decoding data, in interlace order to obtain an interlaced video signed said coding data including bidirectional predictive coding data which use forward and rearward reference images;

memory means for storing decoding data of a frame arrangement output from said decoding means;

synchronizing-signal generation means for generating a synchronizing signal which is synchronized with said video signal and for advancing, in phase, or for delaying, in phase, said synchronizing signal by a predetermined phase to generate a corrected synchronizing signal which is used in display; and write and read control means for performing write with respect to said memory means with said synchronizing signal serving as a time reference, and for performing read with respect to said memory means with said corrected synchronizing signal serving as the time reference, to obtain said interlaced video signal.

12. A letter-box transformation device comprising:

decoding means for decoding input coding data by a predetermined block unit and outputting decoding data, in interlace order to obtain an interlaced video signal said coding data including bidirectional predictive coding data which use forward and rearward reference images;

memory means for storing decoding data of a frame arrangement output from said decoding means;

synchronizing-signal generation means for generating a corrected synchronizing signal which is synchronized with said video signal and in which said synchronizing signal which is used for display is advanced, in phase, or is delayed, in phase, by a predetermined phase;

decoding control means for controlling decoding of said decoding means with said corrected synchronizing signal serving as a time reference; and write and read control means for performing write with respect to said memory means with said corrected synchronizing signal serving as the time reference, and for performing read with respect to said memory means with said synchronizing signal service as the time reference, to obtain said interlaced video signal.

13. A letter-box transformation device according to claim 11 or claim 12, wherein said synchronizing signal is advanced or delayed on the basis of at least one of display vertical offset processing and scanning-line-number transformation processing.

* * * * *